US006962228B2

(12) United States Patent
Ogino et al.

(10) Patent No.: US 6,962,228 B2
(45) Date of Patent: Nov. 8, 2005

(54) CONTACT DETECTING DEVICE AND VEHICLE MOUNTING THE SAME

(75) Inventors: Hiroyuki Ogino, Nara (JP); Shigeki Ueda, Yamatokohriyama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 147 days.

(21) Appl. No.: 10/352,571

(22) Filed: Jan. 28, 2003

(65) Prior Publication Data

US 2004/0112662 A1    Jun. 17, 2004

(30) Foreign Application Priority Data

Dec. 17, 2002  (JP) .............................. 2002-365427
Dec. 27, 2002  (JP) .............................. 2002-382413

(51) Int. Cl.[7] ............................................. B60K 28/10

(52) U.S. Cl. ..................................................... 180/274

(58) Field of Search .................................. 180/274, 271

(56) References Cited

U.S. PATENT DOCUMENTS 4,351,016 A * 9/1982 Felbinger .................... 361/181
4,943,757 A   7/1990 Richter et al.

FOREIGN PATENT DOCUMENTS

| FR | 2732927 | 10/1996 |
| JP | 8-58501 | 3/1996 |
| WO | WO 00/70179 | 11/2000 |

OTHER PUBLICATIONS

Patent Abstracts of Japan, Publication No. 2000103228, Publication Date Apr. 11, 2000, "Window Frame Pressure Sensitive Device", 1 page.

* cited by examiner

*Primary Examiner*—Faye M. Fleming
(74) *Attorney, Agent, or Firm*—Pearne & Gordon LLP

(57) ABSTRACT

A bumper sensor unit including a cord-shaped pressure sensitive sensor is fixed around a bumper of a running device to detect a contact of an obstacle based on a signal output from the cord-shaped pressure sensitive sensor. In that case, contact detecting means comprises a filtering section for removing the oscillation frequency component of a contact detecting object from the signal output from the cord-shaped pressure sensitive sensor.

18 Claims, 23 Drawing Sheets

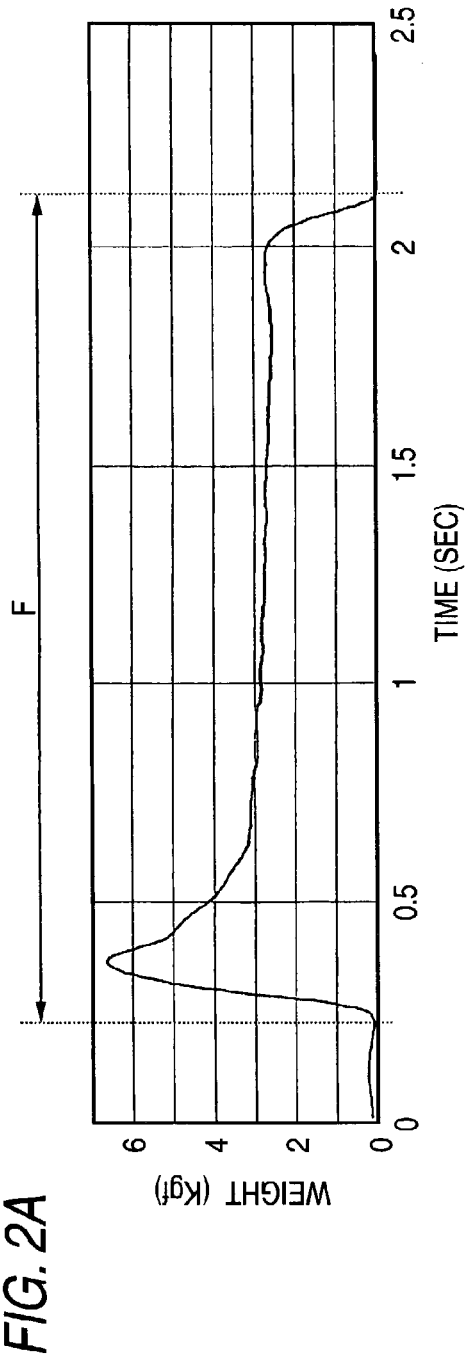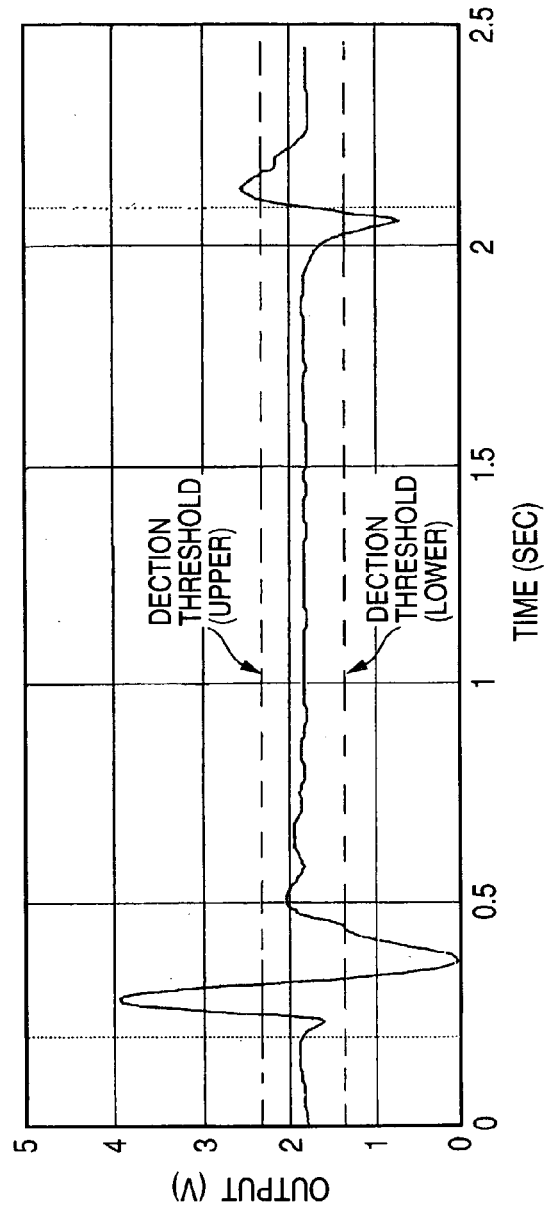

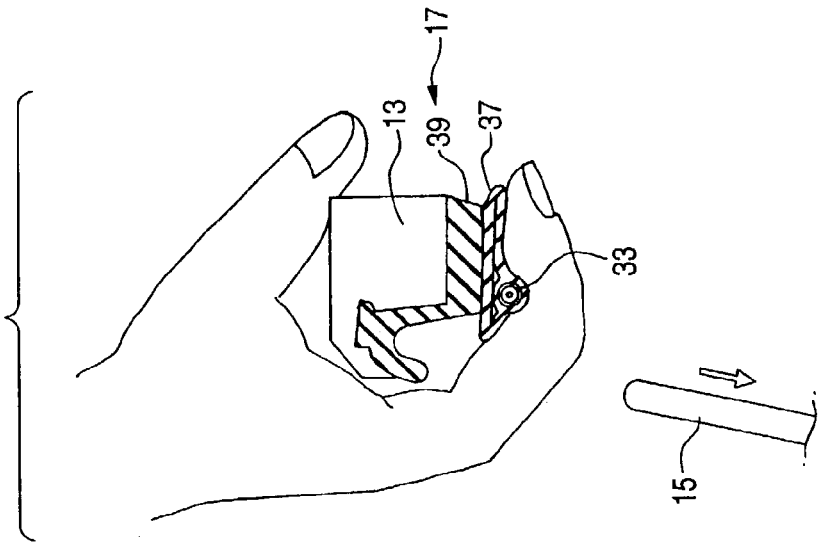
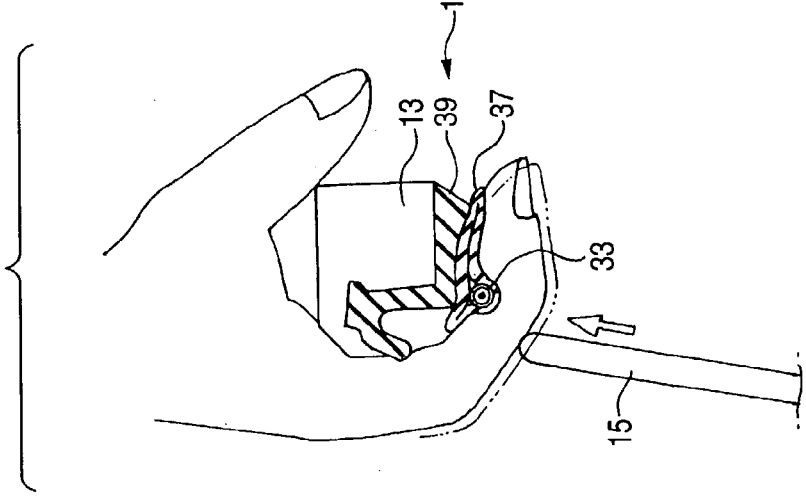
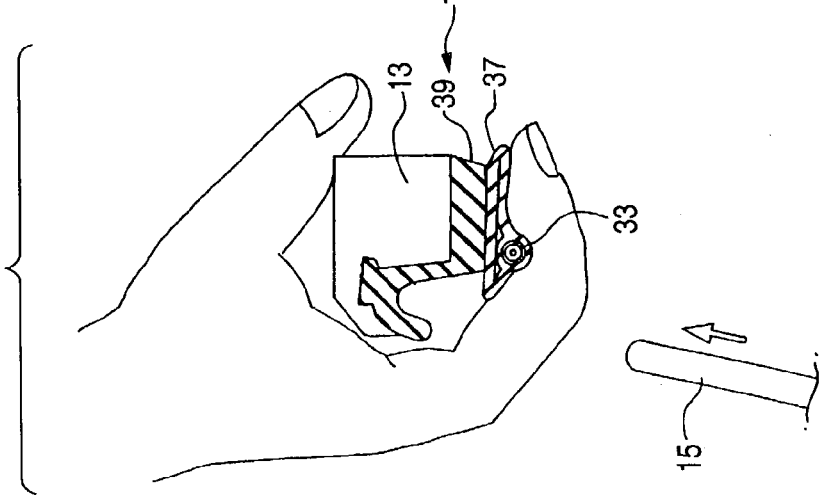

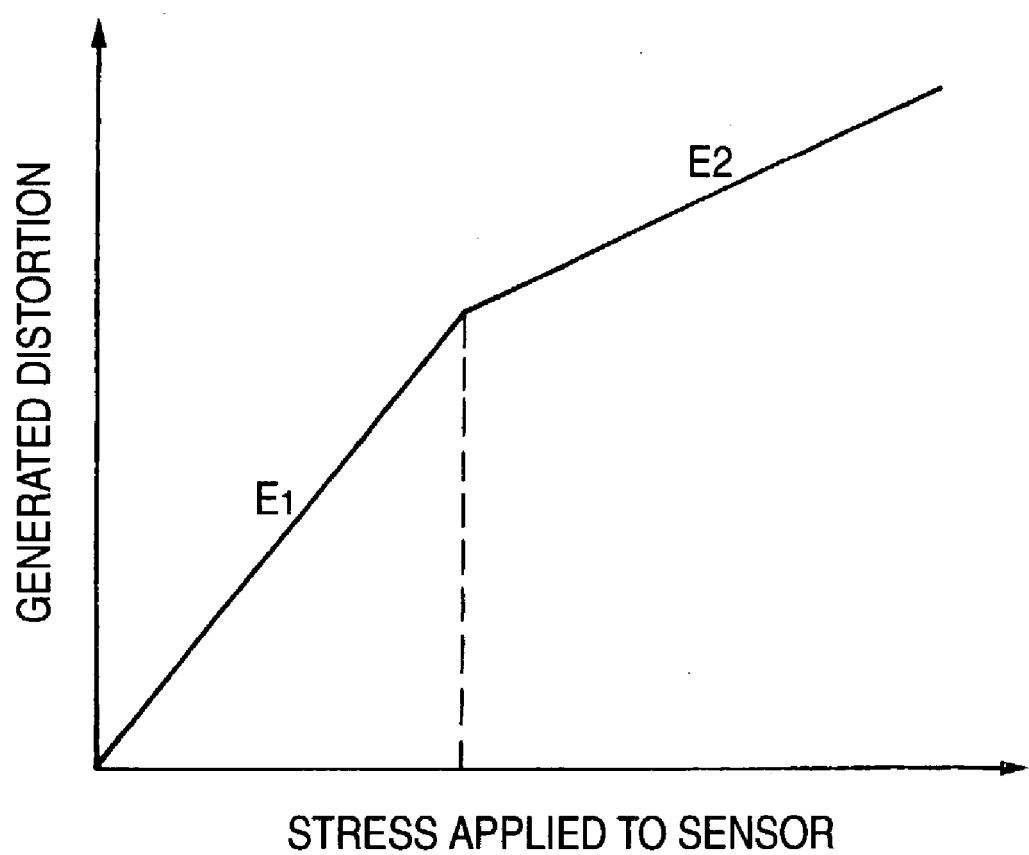

CONTACT DETECTING DEVICE AND VEHICLE MOUNTING THE SAME

BACKGROUND OF THE INVENTION

The present invention relates to a contact detecting device having a cord-shaped pressure sensitive sensor provided on a contact detecting object and serving to accurately and rapidly detect that a part of a thing or a human body comes in contact with the contact detecting object with a pulse output obtained by applying force to the cord-shaped pressure sensitive sensor, and a vehicle comprising the contact detecting device.

Conventionally, a contact detecting device of this type and a running device have detected a contact with an obstacle by means of a bumper sensor comprising a tape switch (for example, see Japanese Patent Document JP-A-8-58501.

FIGS. 10A and 10B are views showing a running device comprising a conventional contact detecting device described in the Patent Document 1, FIG. 10A being a schematic view showing a side surface and FIG. 10B being a schematic view showing a planar section.

In FIGS. 10A and 10B, 80 denotes a running device, 81 denotes a running device body, 82 denotes a truck, 83 denotes a driving wheel, 84 denotes a driven wheel, 84a denotes a front driven wheel and 84b denotes a rear driven wheel. 85 denotes a bumper. 86 denotes a bumper sensor comprising a tape switch. Thus, the conventional contact detecting device has such a structure that the tape switch 86 is provided around the bumper 85. When an obstacle comes in contact with the bumper 85 while the running device 80 is running, the tape switch of the bumper sensor 86 is turned ON so that the contact of the obstacle is detected. When the bumper sensor 86 detects the contact of the obstacle, the driving operation of the driving wheel 83 is stopped.

Moreover, since the bumper sensor 86 is the tape switch, it is turned ON if a small rounded portion is present in a provision portion. As shown in the drawing, therefore, it is necessary to form an insertion hole 85b inserting the bumper sensor 86 on both sides of a corner section 85a of the bumper 85 and to provide the bumper sensor 86 excluding the small rounded portion such as the corner section 85a.

With the structures of the conventional contact detecting device and the conventional running device, however, the insertion hole 85b inserting the bumper sensor 86 is provided on both sides of the corner section 85a, and furthermore, the bumper sensor 86 is to be inserted therein. For this reason, there is a problem in that a great deal of time and labor is taken and the hole is made to give a poor appearance.

In order to previously solve the problem, therefore, it is provided a cord-shaped pressure sensitive sensor around a bumper, thereby eliminating the necessity for forming an insertion hole on both sides of a corner section.

Description will be briefly given to the reason why an ON state is not brought even if the cord-shaped pressure sensitive sensor is bent and provided in the corner section of a bumper perpendicularly.

The cord-shaped pressure sensitive sensor is a cable-shaped sensor using a piezoelement material, and FIG. 1 shows a structure thereof. In FIG. 1, 10 denotes a cord-shaped pressure sensitive sensor in which a core (a center electrode) 1 is provided on a center in an axial direction and the center electrode 1 is covered with a piezoelement material 2, and furthermore, a ground electrode 3 is provided around the piezoelement material 2 and an outermost periphery is covered with a PVC (vinyl chloride resin) 4.

The cord-shaped pressure sensitive sensor 10 uses, for the piezoelement material 2, a resin-based material having a heat resistance which was developed originally by the applicant and has a working temperature of 120° C. or less, and can be used in a higher temperature region (120° C. or less) than 90° C. to be a maximum working temperature of a polymer piezoelement material (uniaxial drawn polyvinylidene fluoride) and a piezoelement material (a piezoelement material of chloroprene and piezoelectric ceramic powder) which are conventionally typical. The piezoelement material 2 is constituted by a resin having a flexibility and piezoelectric ceramic, and furthermore, is constituted by using a flexible electrode comprising a coil-shaped metallic center electrode and a film-shaped ground electrode and has a flexibility which is equivalent to that of an ordinary vinyl cord.

Furthermore, the cord-shaped pressure sensitive sensor 10 has a high sensitivity which is equivalent to that of the polymer piezoelement material, and has a high sensitivity which is equivalent to that of the polymer piezoelement material in such a low frequency region (10 Hz or less) as to detect the pinching of a human body. The reason is that the dielectric constant (approximately 55) of the piezoelement material 2 is greater than that (approximately 10) of the polymer piezoelement material and a reduction in the sensitivity is therefore small also in the low frequency region (10 Hz or less).

The piezoelement material 2 is constituted by a complex including a resin-based material and piezoelectric ceramic powder having a size of 10 μm or less, and an oscillation detecting characteristic can be realized by ceramic and a flexibility can be realized by a resin. The piezoelement material 2 can realize a high heat resistance (120° C.) and a flexibility which can easily be obtained by compounding an amorphous polyethylene based resin (a molecular weight of approximately 300,000) and an amorphous polyethylene based resin (a molecular weight of approximately 100,000) as a resin based-material, and can carry out a simple manufacturing process which does not require bridging.

The cord-shaped pressure sensitive sensor 10 thus obtained has no piezoelectric performance with the piezoelement material 2 molded. By applying a high DC voltage of several kV/mm to the piezoelement material 2, therefore, it is necessary to carry out a processing (a polarization processing) of giving the piezoelectric performance to the piezoelement material 2. The polarization processing is carried out by forming the center electrode 1 and the ground electrode 3 on the piezoelement material 2 and then applying a high DC voltage to both of the electrodes. In the case in which a very small defect such as a crack is present in the piezoelement material 2, a discharge is carried out in the defect portion so that both of the electrodes are apt to be short-circuited. Consequently, a sufficient polarization voltage cannot be applied. In the invention, however, an original polarizing step using an auxiliary electrode capable of adhering to the piezoelement material 2 having a constant length is established so that a defect can be detected and avoided to stabilize polarization. Consequently, an increase in a length of several tens meters or more can also be implemented.

In the cord-shaped pressure sensitive sensor, moreover, a coil-shaped metallic center electrode is used for the center electrode 1 and a film-shaped electrode (a three-layer laminated film comprising aluminum—polyethylene terephthalate—aluminum) is used for the ground electrode 3. Consequently, the adhesion of the piezoelement material 2 and the electrode can be maintained and the connection of an external lead wire can easily be carried out so that a flexible cable-shaped mounting structure can be obtained.

The center electrode 1 is formed of a copper—silver alloy coil, the ground electrode 3 is formed of the three-layer laminated film comprising aluminum-polyethylene terephthalate—aluminum, the piezoelement material 2 is formed of a polyethylene based resin and piezoelectric ceramic powder, and a housing is formed of thermoplastic. Consequently, a dielectric constant is 55, an electric charge generation amount is 10 to 13 C (coulomb)/gf, and a maximum working temperature is 120° C.

FIGS. 2A and 2B are charts showing a load applied to the cord-shaped pressure sensitive sensor 10 and a sensor output characteristic. The applicant conducted an experiment on the relationship between the load of the cord-shaped pressure sensitive sensor 10 and the sensor output. As a result, when a bending load shown in FIG. 2A is applied to the cord-shaped pressure sensitive sensor 10, the sensor output presents a phenomenon shown in FIG. 2B.

(1) More specifically, when the load is not applied to the cord-shaped pressure sensitive sensor 10 at a time t0, the sensor output indicates 2(V).
(2) When a bending load is applied to the cord-shaped pressure sensitive sensor 10 in a constant direction at a time t1, the sensor output is increased to 4(V) the moment the bending load is applied and is then inverted to 0(V) immediately, and is thereafter returned to 2(V) again.
(3) Subsequently, the sensor output is maintained to be 2(V) with bending.
(4) When the cord-shaped pressure sensitive sensor 10 is returned to an original state at a time t3, the sensor output is decreased to 0.8(V) instantaneously and is then inverted to 2.2(V) immediately, and is thereafter returned to 2(V) again.

In the cord-shaped pressure sensitive sensor, thus, a signal is output only the moment force is applied. Even if the force is then applied continuously, an output is not sent any longer until a fluctuation is generated. Similarly, the cord-shaped pressure sensitive sensor has such a characteristic that the output is sent the moment the force is removed. Also in the case in which the cord-shaped pressure sensitive sensor is bent and provided perpendicularly in the corner section of a bumper, accordingly, it is brought into an ON state the moment it is bent, and the output is not sent after the completion of the provision. Then, the output is sent when force is applied to any part of the cord-shaped pressure sensitive sensor.

If the cord-shaped pressure sensitive sensor is provided around the bumper, thus, it is not necessary to provide an insertion hole on both sides of the corner section.

FIGS. 3A and 3B are view showing a running device having the cord-shaped pressure sensitive sensor provided around a bumper, FIG. 3A being a schematic view showing a side surface and FIG. 3B being a schematic view showing a planar section.

In FIG. 3A, 20 denotes a running device, 21 denotes a running device body, 22 denotes a truck, 23 denotes a pair of left and right driving wheels, 23a denotes a motor for driving the wheels, 24 denotes a driven wheel, 24a denotes a front driven wheel and 24b denotes a rear driven wheel. Moreover, 25 denotes a bumper and 26 denotes a bumper sensor unit. The cord-shaped pressure sensitive sensor 10 (FIG. 1) is provided in the bumper sensor unit 26.

In FIG. 3B, furthermore, 27 denotes contact detecting means for detecting an output from the cord-shaped pressure sensitive sensor 10, and 28 denotes driving control means of the motor 23a for driving the pair of left and right driving wheels 23.

FIG. 4A is a block diagram showing the contact detecting means 27 in FIG. 3.

In FIG. 4A, the contact detecting means 27 comprises a contact detecting section 27b for detecting the contact of an obstacle based on the output signal of the cord-shaped pressure sensitive sensor 10 upon receipt of the same signal. A signal output from the contact detecting section 27b is given to the driving control means 28, and the driving control means 28 immediately stops the motor 23a upon receipt of the same signal, thereby stopping the driving operation of the pair of left and right driving wheels 23.

Thus, the contact detecting device 27 is constituted by the bumper sensor unit 26 including the cord-shaped pressure sensitive sensor 10 and the contact detecting means 27. The bumper sensor unit 26 is attached to the bumper 25 provided around the running device body 21 as shown in FIG. 5A.

FIGS. 5A and 5B are enlarged sectional views showing a bumper sensor unit to be a contact detecting device attached to a bumper, and FIG. 5A is a sectional view taken along an A—A line in FIG. 3B. FIG. 5B is a sectional view showing a bumper sensor unit according to the invention which will be described below.

In FIG. 5A, the bumper sensor unit 26 shown in FIG. 3 is constituted by an elastic fixing member 30 to be fixed to the bumper 25 through a fixing plate 38 with a fixing screw 39, and the cord-shaped pressure sensitive sensor 10 shown in FIG. 1 which is provided in the elastic fixing member 30.

The cord-shaped pressure sensitive sensor 10 is obtained by coaxially molding the center electrode 1, the piezoelement material 2 and the ground electrode 3 as described with reference to FIG. 1. A piezoelement material comprising a mixture of a resin based material and piezoelectric ceramics powder is used for the piezoelement material 2, and the piezoelement material 2 has a flexibility as a whole sensor.

On the other hand, the elastic fixing member 30 is formed by using rubber or thermoplastic elastomer including a space for accommodating the cord-shaped pressure sensitive sensor 10, a gap section 32 for accommodating the fixing plate 38, and a hollow section 35 for forming an elasticity. The hollow section 35 has a rib 31 for maintaining shapes provided on a center in such a manner that the elastic fixing member 30 is neither deformed by a dead weight nor crushed by a corner section 25a of the running device body 21. In the elastic fixing member 30, the fixing plate 38 is inserted in the gap section 32 and is secured to the bumper 25 with the screw 39 in a cantilever condition. When the cord-shaped pressure sensitive sensor 10 is to be provided in the elastic fixing member 30, it is preferable that a tongue section 33 should be turned up and a slit section 34 should be opened to slide and put in the cord-shaped pressure sensitive sensor 10.

Moreover, it is preferable that a dimension L in a height direction of the elastic fixing member 30 should be set to be greater than a distance at which the running device runs while the contact detecting means 27 detects a contact with an obstacle and the control means 28 then controls the stop of running.

By the structure described above, the running device 20 outputs a signal to the contact detecting means 27 when the cord-shaped pressure sensitive sensor 10 provided around the bumper 25 senses a contact, and the contact detecting means 27 decides the contact of the obstacle based on the same signal to send an output signal from the contact detecting section 27b to the driving control means 28, and the driving control means 28 stops the motor 23a immediately upon receipt of the same signal, thereby stopping the driving operation of the pair of left and right driving wheels 23. Consequently, the running device 20 is stopped while the elastic fixing member 30 is deformed. Thus, the bumper 25 can be prevented from colliding with the obstacle. Thus, the running device is safely used as an automated guided vehicle when a baggage is to be carried automatically.

By using the cord-shaped pressure sensitive sensor 10 (FIG. 1) in place of the bumper sensor comprising the tape switch described in the Patent Document 1, thus, a signal is output only the moment force is applied and the output is not sent any longer until a fluctuation is caused even if the force is then applied continuously. Consequently, it is possible to produce a great advantage that the insertion hole does not need to be provided on both sides of the corner section of the bumper.

However, since the cord-shaped pressure sensitive sensor has an excessively high sensitivity, it reacts to a fine oscillation during the running operation of the running device in some cases. Moreover, there is a problem in that the pressure sensitive sensor reacts to a great impact generated when the running device runs on a step, and erroneously detects the impact.

The erroneous detection is rather desirable in respect of fail-safe, and is not preferable in respect of a workability when stopping is carried out without a contact.

SUMMARY OF THE INVENTION

The invention has been made to solve these problems and has an object to provide a contact detecting device for accurately detecting the contact of a thing or a human body and reducing the erroneous detection of the oscillation of a vehicle body during running as much as possible, and a vehicle comprising the same device.

In order to attain the object, a first aspect of the invention is directed to a contact detecting device comprising a cord-shaped pressure sensitive sensor provided on a contact detecting object and contact detecting means for detecting a contact of a thing with the contact detecting object based on a signal output from the cord-shaped pressure sensitive sensor, wherein the contact detecting means includes a filtering section for removing an oscillation frequency component of the contact detecting object from the signal output from the cord-shaped pressure sensitive sensor.

Consequently, the cord-shaped pressure sensitive sensor generates the output signal corresponding to the acceleration of deformation. Even if the piezoelectric sensor is provided along the corner section of a running device, therefore, error detection can be prevented. In addition, an oscillation during the running operation of the running device can be prevented from being picked up by the filtering section for removing the oscillation frequency component of the contact detecting object so that the erroneous detection can be prevented.

A second aspect of the invention is directed to the contact detecting device according to the first aspect of the invention, wherein the filtering section serves to remove a frequency component including a natural frequency of the contact detecting object.

Thus, the filtering section has such a structure as to remove the frequency component including the natural frequency of the contact detecting object. By checking the natural frequency of the contact detecting object, thus, it is possible to easily determine the filtering characteristic of the filtering section.

A third aspect of the invention is directed to a contact detecting device comprising a cord-shaped pressure sensitive sensor provided on a contact detecting object and contact detecting means for detecting a contact of a thing with the contact detecting object based on a signal output from the cord-shaped pressure sensitive sensor, wherein the cord-shaped pressure sensitive sensor is provided on the contact detecting object through support means having a different oscillation characteristic from a natural oscillation characteristic of the contact detecting object.

Consequently, the cord-shaped pressure sensitive sensor generates the output signal corresponding to the acceleration of deformation. Even if the piezoelectric sensor is provided along the corner section of a running device, therefore, error detection can be prevented. In addition, an oscillation during the running operation of the running device can be prevented from being picked up by the support means having a different oscillation characteristic from the natural oscillation characteristic so that the erroneous detection can be prevented.

A fourth aspect of the invention is directed to the contact detecting device according to the first or second aspect of the invention, wherein the cord-shaped pressure sensitive sensor is provided on the contact detecting object through support means having a different oscillation characteristic from a natural oscillation characteristic of the contact detecting object.

Consequently, the double countermeasures are taken. Therefore, it is possible to more reliably prevent the erroneous detection in which the oscillation during the running operation of the running device is picked up.

A fifth aspect of the invention is directed to the contact detecting device according to any of the first to fourth aspects of the invention, wherein the contact detecting object includes an automated guided vehicle or a bumper of a vehicle, a security object, a power window of a vehicle, or an automatic door of an elevator or a house entrance.

A sixth aspect of the invention is directed to an automated guided vehicle, a vehicle, a security object or an elevator comprising the contact detecting device according to any of the first to fourth aspects of the invention and having control means for controlling opening and closing means based on a signal output from the contact detecting device.

Consequently, the automated guided vehicle or the bumper of a vehicle, the security object or the power window of a vehicle, or the automatic door of an elevator or a house entrance can be prevented from malfunctioning due to a noise other than original detection.

Preferably, in the above described contact detecting device, the support means including at least a first deformation section having a first elastic modulus and serving to increase deformation of the pressure sensitive sensor, and a second deformation section having a second elastic modulus which is higher than the first elastic modulus.

In the case in which external force is suddenly applied to the pressure sensitive sensor, a time taken from the start of a contact to the end thereof is recognized based on a signal output from the piezoelectric sensor and a driving operation for this period can be locked. Also in the case in which external force is applied under a static pressure in which a pressure is preloaded to the pressure sensitive sensor, moreover, the second deformation section of the support member is deformed so that a signal having a sufficient output level can be obtained from the piezoelectric sensor and reliable detection can be carried out.

BRIEF DESCRIPTION OF THE DRAWINGS

FIGS. 2A and 2B are charts showing a load applied to the cord-shaped pressure sensitive sensor and a sensor output characteristic;

FIGS. 19A to 19C are views showing a state in which a pressure is detected in a compression state, FIG. 19A being an explanatory view showing the application of a static load, FIG. 19B being an explanatory view showing a state in which a pressure is further applied, and FIG. 19C being an explanatory view showing a state in which a pressure is detected to return a windowpane;

FIG. 20 is a graph representing the deformation characteristics of a first deformation section and a second deformation section;

DETAILED DESCRIPTION OF THE PREFERRED EMBODIMENTS

Embodiments of the invention will be described below in detail with reference to the drawings.

(First Embodiment)

Figure 4A:
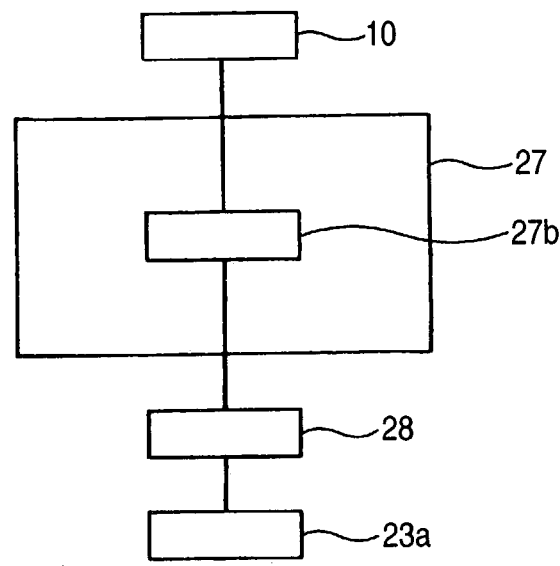
FIGS. 4A and 4B are block diagrams showing contact detecting means.
Figure 4B:
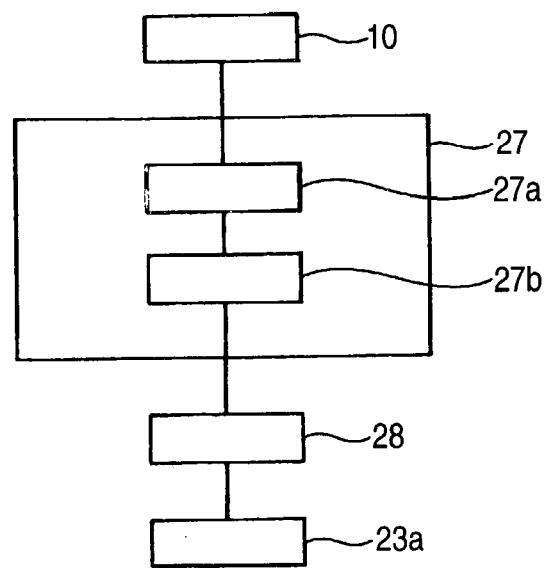

FIG. 4B is a block diagram showing contact detecting means 27 according to a first embodiment of the invention. FIG. 4B is different from FIG. 4A in that the contact detecting means 27 comprises a filtering section 27a for removing an oscillation frequency component during the running operation of a running device 20 in response to a signal output from a cord-shaped pressure sensitive sensor 10, and other structures are the same and a contact detecting section 27b for detecting the contact of an obstacle based on a signal output from the filtering section 27a is provided.

By such a structure, when the contact detecting means 27 receives the signal output from the cord-shaped pressure sensitive sensor 10, the filtering section 27a removes a portion based on the oscillation frequency component during the running operation of the running device 20, and sends only the contact signal of a true obstacle to the contact detecting section 27b. The contact detecting section 27b sends an output signal to driving control means 28 and the driving control means 28 stops a motor 23a immediately after receiving the same signal, thereby stopping the driving operation of a pair of left and right driving wheels 23.

Figure 6:
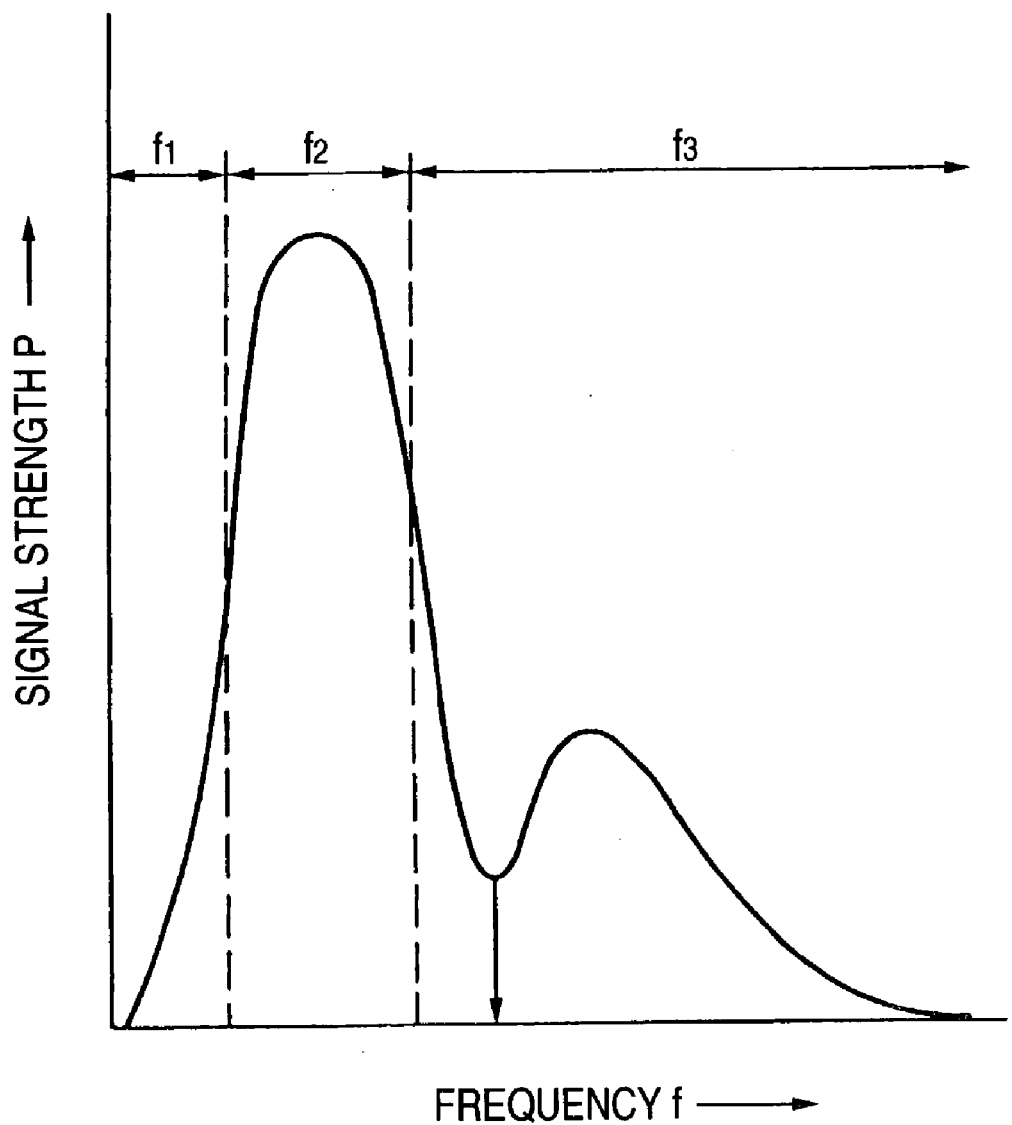
FIG. 6 is a characteristic chart showing the filtering frequency characteristic of a filtering section.

FIG. 6 is a characteristic chart showing the filtering frequency characteristic of the filtering section 27a.

In FIG. 6, an axis of ordinate P indicates a signal strength and an axis of abscissa f indicates a frequency. The filtering section 27a shown in FIG. 4 has a filtering characteristic for removing an oscillation frequency component f3 during the running operation of the running device 20. The frequency component f3 can be obtained experimentally and usually includes a natural frequency f0 of a body 1. Therefore, a filtering characteristic may be determined in such a manner that the natural frequency of the body 1 is obtained before an experiment and the natural frequency thus obtained or the frequency component of a specific frequency band including the natural frequency is selectively removed. In this case, for example, it is preferable that the weight of a baggage to be loaded into the running device 20 should be changed or the height of the baggage loading section of the running device 20 should be varied to determine the filtering characteristic in consideration of an actual working state.

More specifically, as shown in FIG. 6, a frequency component of 10 Hz or more is removed as the filtering characteristic in consideration of undesired radiation such as a high frequency noise in a commercial power supply or a factory or a radio noise for communication, for example.

Furthermore, such a filtering characteristic as to remove a frequency in a certain band of several tens Hz or more is added to be the natural frequency band of the running device 20, for example.

In order to remove beats or slow oscillations of the running device 20 loading a baggage during running, moreover, it is also possible to add such a filtering characteristic as to remove the frequency component of a lower frequency region f1 than the oscillation frequency component as shown in FIG. 6, for example. It is preferable that a frequency component of 1 Hz or less should be removed, for example.

Also in case of a running device having a suspension or an air tire, furthermore, it is desirable that the filtering characteristic for removing the frequency component in the low frequency region f1 should be added in the same manner as described above in order to remove the oscillation component in the low frequency region f1 based on the motion of the suspension or the air tire which is caused during the running.

The operation and function of the contact detecting means 27 comprising the filtering section (27a in FIG. 4B) having the filtering characteristic shown in FIG. 6 will be described with reference to FIGS. 7A to 7D.

Figure 7A:
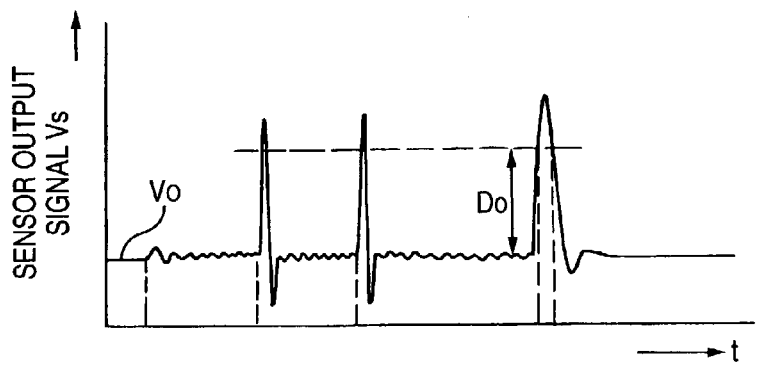
FIGS. 7A to 7D are charts for explaining the operation and function of contact detecting means by the cord-shaped pressure sensitive sensor, FIG. 7A being a characteristic chart showing an output signal VS of a cord-shaped pressure sensitive sensor 10, FIG. 7B being a characteristic chart showing an output signal Vf of a filtering section 27a, FIG. 7C being a characteristic chart showing a decision output J of contact detecting means 27 and FIG. 7D being a characteristic chart showing a voltage Vm applied to a motor 23a, and an axis of abscissa indicating a time t in common to all the charts.
Figure 7B:
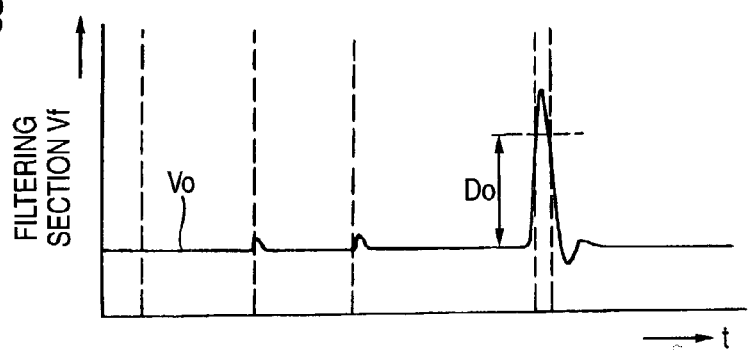
Figure 7C:
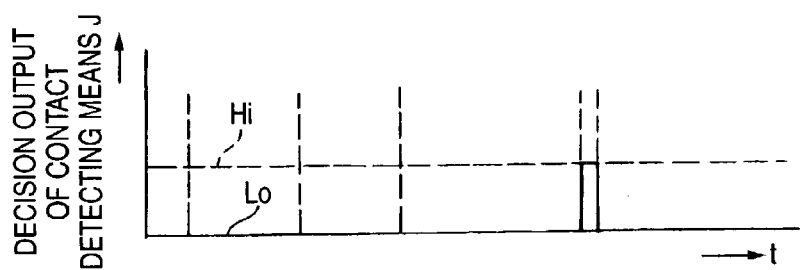
Figure 7D:
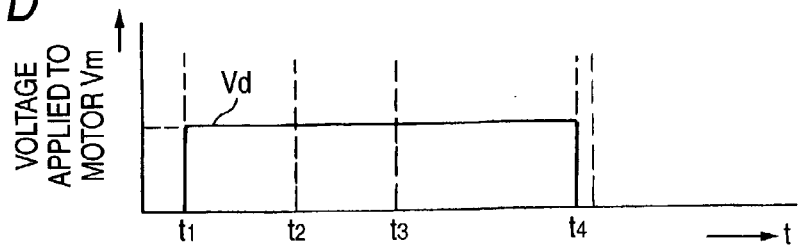

FIGS. 7A to 7D are charts for explaining the operation and function of the contact detecting means by the cord-shaped pressure sensitive sensor 10, FIG. 7A being a characteristic chart showing an output signal VS of the cord-shaped pressure sensitive sensor 10, FIG. 7B being a characteristic chart showing an output signal Vf of the filtering section 27a, FIG. 7C being a characteristic chart showing a decision output J of the contact detecting means 27, and FIG. 7D being a characteristic chart showing a voltage Vm applied to the motor 23a. An axis of abscissa indicates a time t in common to all the charts.

Description will be given to the behaviors of the output signal VS of the cord-shaped pressure sensitive sensor 10, the output signal Vf of the filtering section 27a, the decision output J of the contact detecting means 27 and the voltage Vm applied to the motor 23a respectively in the case in which the running device 20 passes through a step and then comes in contact with an obstacle.

First of all, when a voltage of +Vd is applied to the motor 23a by the control means 27 at a time t1, the running device 20 starts running. During the running, the cord-shaped pressure sensitive sensor 10 is oscillated due to the running oscillation of the running device 20, and a signal corresponding to the acceleration of the deformation of the cord-shaped pressure sensitive sensor 10 shown in FIG. 7A is output from the cord-shaped pressure sensitive sensor 10 by piezoelectric effects. More specifically, a fine fluctuation component is superposed on a reference potential V0 for VS.

In FIG. 7A, a signal exceeding a predetermined great amplitude D0 is generated when the running device 20 runs on a step at a time t2. When the running device 20 completely passes through the step at a time t3, a large signal is generated again. A great oscillation is applied to the cord-shaped pressure sensitive sensor 10 by an impact caused by running on the step and completely passing through the step. Consequently, a signal having a great amplitude is generated for VS.

Then, when an obstacle comes in contact with a bumper 25 at a time t4, the cord-shaped pressure sensitive sensor 10 is deformed by the pressing of the obstacle so that a signal having a great amplitude is generated for VS.

At this time, the output V0 sent from the filtering section 27a filters the output signal of the cord-shaped pressure sensitive sensor 10 based on the filtering characteristic of FIG. 6. Therefore, the oscillation frequency component f3 during the running including the natural frequency f0 of the running device 20 is removed as shown in FIG. 7B, and furthermore, the low oscillation component of f1 generated when the running device 20 runs on the step is also removed. Finally, only a frequency component indicated as f2 in FIG. 6 which is generated by a contact with an obstacle is caused to pass.

Figure 5A:
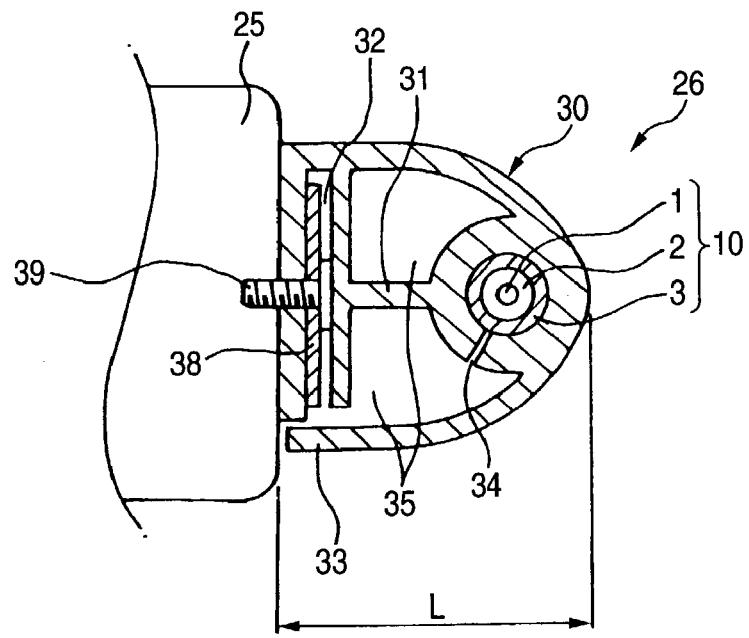
FIGS. 5A and 5B are enlarged sectional views showing a bumper sensor unit to be a contact detecting device, FIG. 5A being a sectional view taken along an A—A line in FIG. 3B and FIG. 5B being a sectional view showing a bumper sensor unit according to the invention.

At time of the contact with the obstacle, the cord-shaped pressure sensitive sensor 10 is slightly deformed in the contact if the cord-shaped pressure sensitive sensor 10 is simply provided in the bumper 25. In the embodiment, however, the cord-shaped pressure sensitive sensor 10 is provided through an elastic fixing member 30 as shown in FIG. 5 and can be deformed together with the elastic fixing member 30 at time of the contact with the obstacle. Consequently, the amount of the deformation of the cord-shaped pressure sensitive sensor 10 is increased. Since the hollow section 35 is also crushed at time of the contact, the amount of the deformation of the cord-shaped pressure sensitive sensor 10 is further increased. Thus, a large amount of the deformation of the cord-shaped pressure sensitive sensor 10 can be obtained and an acceleration to be the secondary differential value of the amount of the deformation is also increased. As a result, the output signal of the cord-shaped pressure sensitive sensor 10 is also increased so that the detection sensitivity of the obstacle can be enhanced.

The contact detecting section 27b decides that the obstacle comes in contact if an amplitude |V−V0| from V0 for Vf is greater than D0, and outputs a pulse signal of Lo→Hi→Lo as a decision output at the time t4. Even if an amplitude |V−V0| from V0 for VS is greater than D0, thus, a contact decision is carried out based on the signal Vf from which an unnecessary frequency component is removed by the filtering section 27a. Therefore, erroneous detection can be prevented from being caused by a running oscillation.

The control means 28 (FIG. 4) stops the application of a voltage of +Vd to the motor 23a if the pulse signal is generated. Consequently, the running operation of the running device 20 is stopped at the time t4. D0 can be set optionally and is preset based on the magnitude of the output signal of the cord-shaped pressure sensitive sensor 10 at time of the contact of the obstacle depending on a running speed or the shape of the elastic fixing member 30, for example.

Moreover, the cord-shaped pressure sensitive sensor 10 is a contactless sensor and an output signal corresponding to the acceleration of deformation is generated as described above. Even if a piezoelectric sensor is provided along a corner section 25a of the running device 20, therefore, erroneous detection in a conventional structure using a tape switch is not generated.

Furthermore, the tape switch is not used differently from the conventional art. Therefore, an insertion hole does not need to be provided in the corner section 25*a* of the running device 20, and a great deal of time and labor is not required for manufacture and an appearance can also be enhanced.

As described above, in the embodiment, the cord-shaped pressure sensitive sensor 10 having a flexibility which can be provided around a mobile running device body and the contact detecting means 27 for detecting that the running device 20 comes in contact with an obstacle based on the output signal of the cord-shaped pressure sensitive sensor 10 are added, and the contact detecting means 27 includes the filtering section 27*a* for removing an oscillation frequency component during the running operation of the running device 20 from the output signal of the cord-shaped pressure sensitive sensor 10. Consequently, the cord-shaped pressure sensitive sensor 10 is a contactless sensor and generates an output signal corresponding to the acceleration of deformation. Thus, it is possible to implement a contact detecting device which can prevent error detection even if the cord-shaped pressure sensitive sensor 10 is provided along the corner section 25*a* of the running device 20.

Furthermore, since the filtering section 27*a* removes an oscillation frequency component during the running operation of the running device 20 from the output signal of the cord-shaped pressure sensitive sensor 10, the contact detecting means 27 can prevent erroneous detection by an oscillation during running.

Moreover, the contact detecting device described above is provided and the control means 28 for controlling running based on the output signal of the contact detecting device is provided. Consequently, the insertion hole 85*b* does not need to be provided on the corner section 25*a* of the running device differently from the conventional art. Thus, a great deal of time and labor is not required for manufacture and an appearance can also be enhanced.

Furthermore, the filtering section 27*b* removes an oscillation frequency component during the running operation of the running device 20 from the output signal of the cord-shaped pressure sensitive sensor 10. Therefore, it is possible to prevent an erroneous operation in which the contact detecting means 27 carries out erroneous detection due to an oscillation during running, thereby stopping the running.

Moreover, the filtering section 27*b* has such a structure as to remove a frequency component including the natural frequency of the running device 20. By checking the natural frequency of the running device 20, therefore, it is possible to easily determine the filtering characteristic of the filtering section.

While the elastic fixing member 30 is fixed to the bumper 25 in the embodiment, the bumper 25 may also serve as the elastic fixing member 30. By this structure, the bumper 25 also serves as the elastic fixing member 30. Consequently, components can be rationalized.

As shown in FIG. 3, furthermore, a dimension L of the elastic fixing member 30 is set to be greater than a distance at which the running device 20 runs while the contact detecting means 27 detects a contact with an obstacle and the control means 28 then controls to stop the running. Even if the obstacle comes in contact with and presses the running device 20, therefore, the running device 20 is stopped before the elastic fixing member 30 is completely crushed. Consequently, an excessive load is not applied to the obstacle and the running device 20 so that safety can be enhanced.

Moreover, it is also possible to employ a structure in which the running is controlled such that a movement is once carried out in an opposite direction to a running direction and running is then carried out in an original running direction when running is started in a stop condition. By this structure, even if an obstacle has already come in contact with the running device 20 in the running direction in the stop condition and the cord-shaped pressure sensitive sensor 10 cannot be deformed any longer, the movement is carried out in the opposite direction to the running direction and the deformation of the cord-shaped pressure sensitive sensor 10 is released, and the cord-shaped pressure sensitive sensor 10 is deformed again in contact with the obstacle at time of running in the original running direction so that the contact with the obstacle is detected by the contact detecting means 27. Consequently, the safety can further be enhanced.

(Second Embodiment)

Next, a second embodiment of the invention will be described with reference to FIG. 5B.

Figure 1:
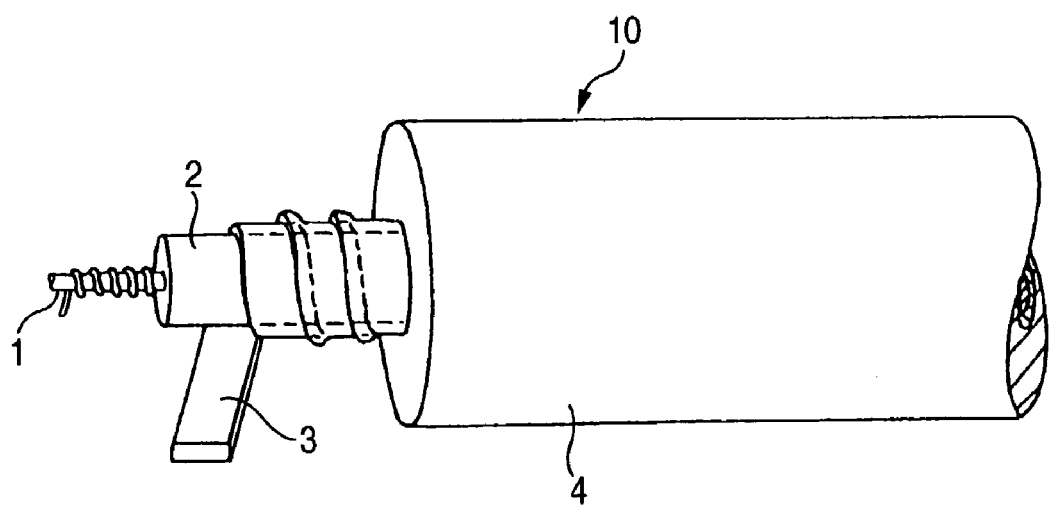
FIG. 1 is a view showing the structure of a cord-shaped pressure sensitive sensor to be used in the invention.
Figure 3A:
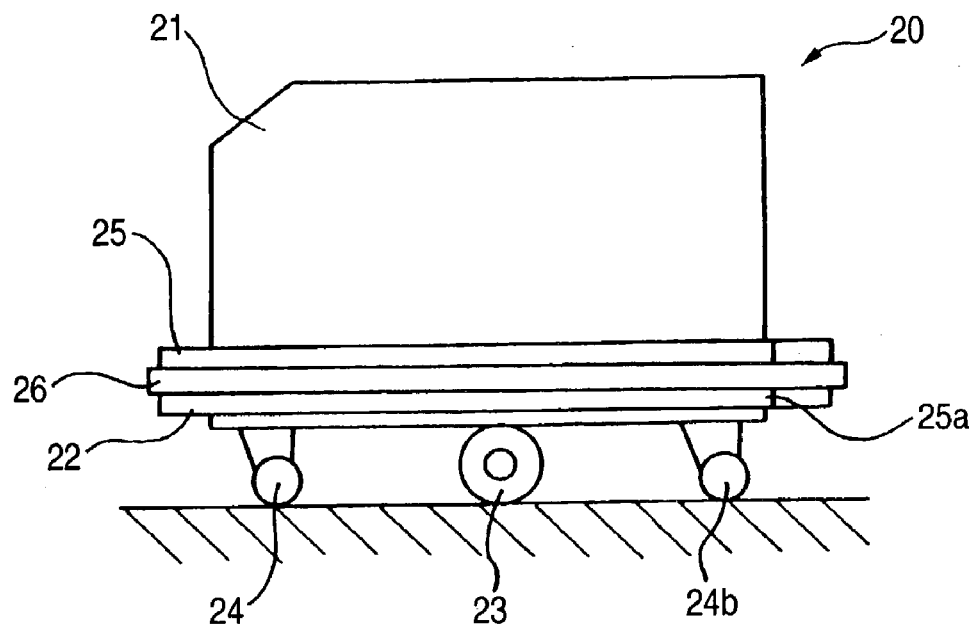
FIGS. 3A and 3B are views showing a running device in which the cord-shaped pressure sensitive sensor is provided around a bumper, FIG. 3A being a schematic view showing a side surface and FIG. 3B being a schematic view showing a planar section.
Figure 3B:
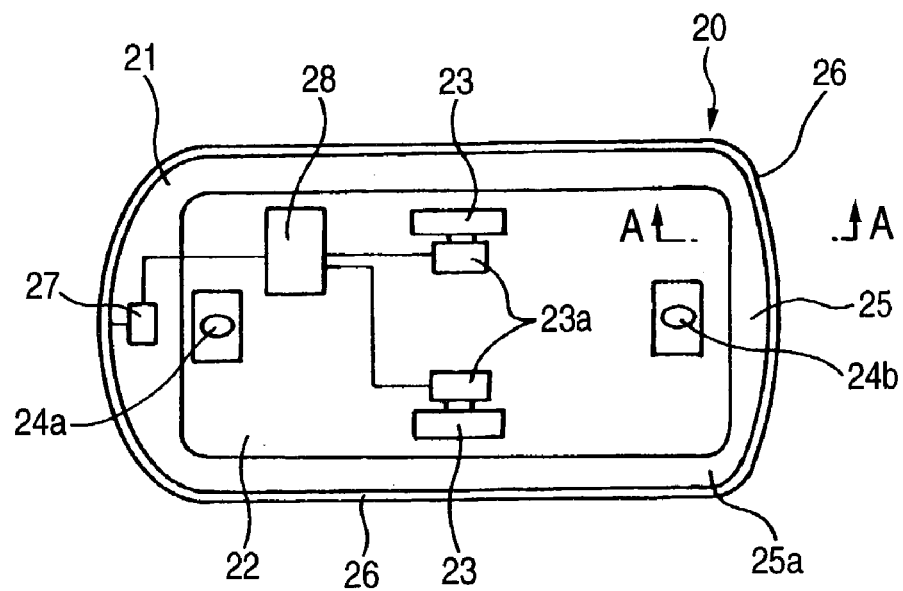
Figure 5B:
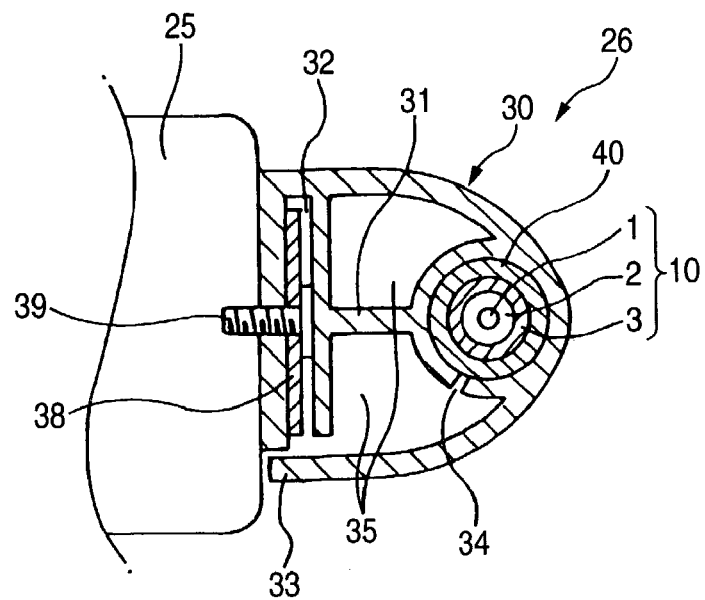

FIG. 5B is a sectional view showing a bumper sensor unit 14 of a running device according to a second embodiment of the invention (corresponding to an A—A line in FIG. 3B).

The second embodiment is different from the structure according to the first embodiment in that a cord-shaped pressure sensitive sensor 10 is attached to a bumper 25 through an elastic fixing member 30 having a different oscillation characteristic from the natural oscillation characteristic of the running device 20 (FIGS. 3A and 3B).

Components other than those described above are the same as in the first embodiment and detailed description will be omitted.

In order to cause the elastic fixing member 30 to have a different oscillation characteristic from the natural oscillation characteristic of the running device 20, for example, a different material of a partial space 40 in the elastic fixing member 30 is inserted or an air layer is provided to carry out a trial experiment.

By the structure described above, the elastic fixing member 30 removes an oscillation during running which is propagated from the running device 20 and a noise is not applied to the cord-shaped pressure sensitive sensor 10. Consequently, contact detecting means 27 (in this case, FIG. 4A is available) can prevent erroneous detection by the oscillation during the running.

Figure 8A:
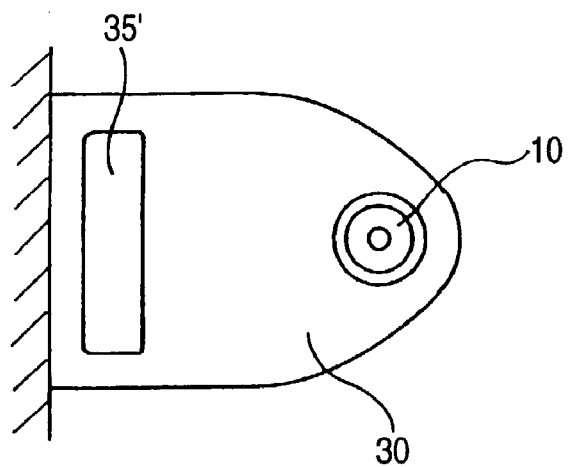
FIGS. 8A to 8C are views illustrating an elastic fixing member having a different oscillation characteristic from the natural oscillation characteristic of the running device.
Figure 8B:
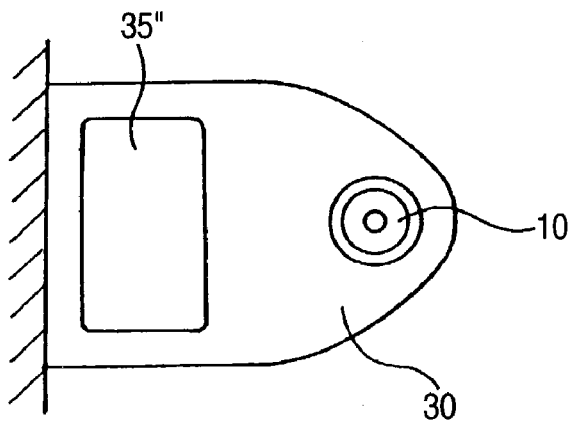
Figure 8C:
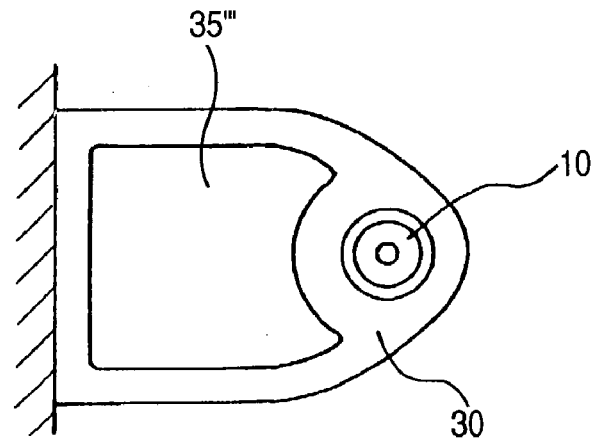

FIGS. 8A to 8C are views illustrating the elastic fixing member 30 having a different oscillation characteristic from the natural oscillation characteristic of the running device 20.

In FIGS. 8A to 8C, 30 denotes the elastic fixing member enclosing the cord-shaped pressure sensitive sensor 10, and a gap 35 is provided between an attachment portion (shown in hatching) and the cord-shaped pressure sensitive sensor 10. FIG. 8A shows a small gap 35', FIG. 8B shows a greater gap 35" and FIG. 8C shows a maximum gap 35'''.

Since the elastic fixing member 30 in FIG. 8A is firm, the sensitivity of the cord-shaped pressure sensitive sensor 10 is reduced.

To the contrary, since the elastic fixing member 30 in FIG. 8C is not firm, the sensitivity is increased and resonance with the ordinary idling of a vehicle is detected erroneously.

The elastic fixing member 30 shown in FIG. 8B is intermediate between those shown in FIGS. 8A and 8C and is set within a range employed in the second embodiment. The specific size of the gap 35 is determined depending on the natural oscillation characteristic of the running device 20.

According to the second embodiment, thus, the elastic fixing member 30 removes an oscillation during running which is propagated from the running device 20. Therefore, the oscillation during the running can be prevented from being detected erroneously.

By using the first embodiment together, furthermore, an excessive impact is applied to the running device 20 during the running and the filtering section 27a in FIG. 4B removes an oscillation frequency component during the running operation of the running device 20 from the output signal of the cord-shaped pressure sensitive sensor 10 even if the elastic fixing member 30 cannot completely attenuate the oscillation caused by the impact. Consequently, the contact detecting means 27 can be prevented from erroneously detecting the oscillation during the running. Thus, an advantage can be obtained more reliably.

While the contact detecting device and the running device are applied to an automated guided vehicle for carrying a baggage in the first and second embodiments, they may be applied to a mobile body such as a vehicle, a kart or a toy and a piezoelectric sensor can be provided in conformity with various shapes of the mobile bodies to detect an obstacle.

Figure 9A:
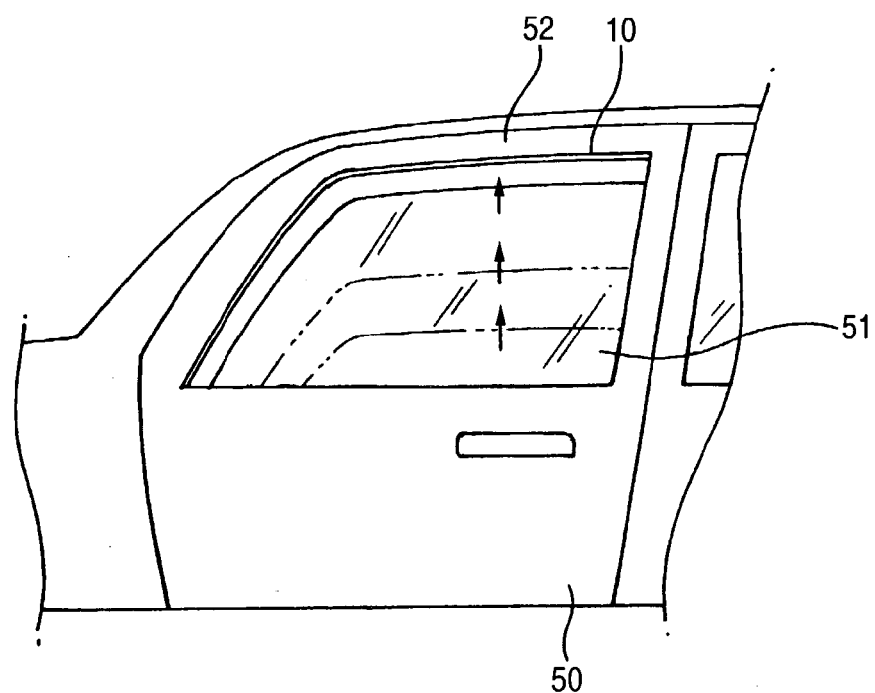
FIGS. 9A and 9B are views illustrating another example in which the cord-shaped pressure sensitive sensor is applied, FIG. 9A showing an example of application to the power window of a vehicle and FIG. 9B showing an example of application to the automatic door of an elevator.
Figure 9B:
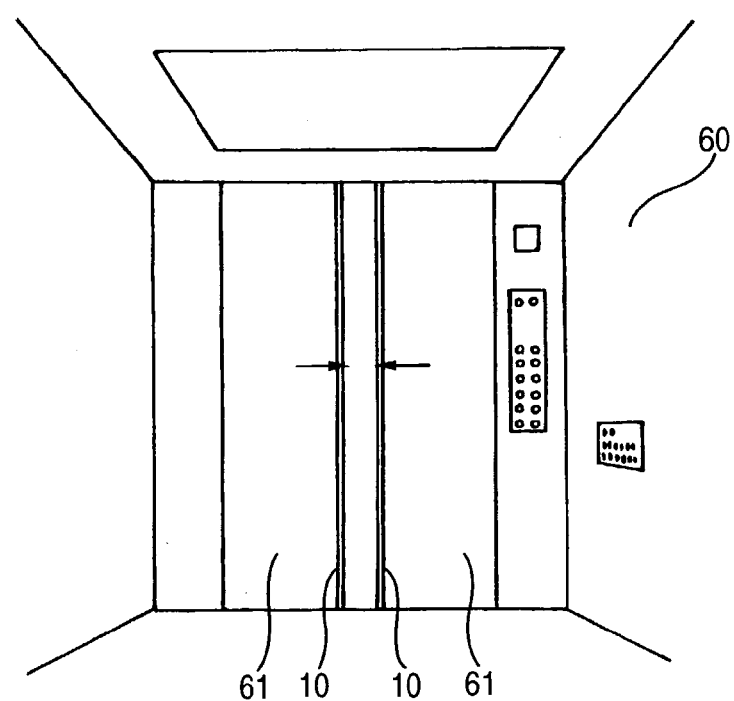
Figure 10A:
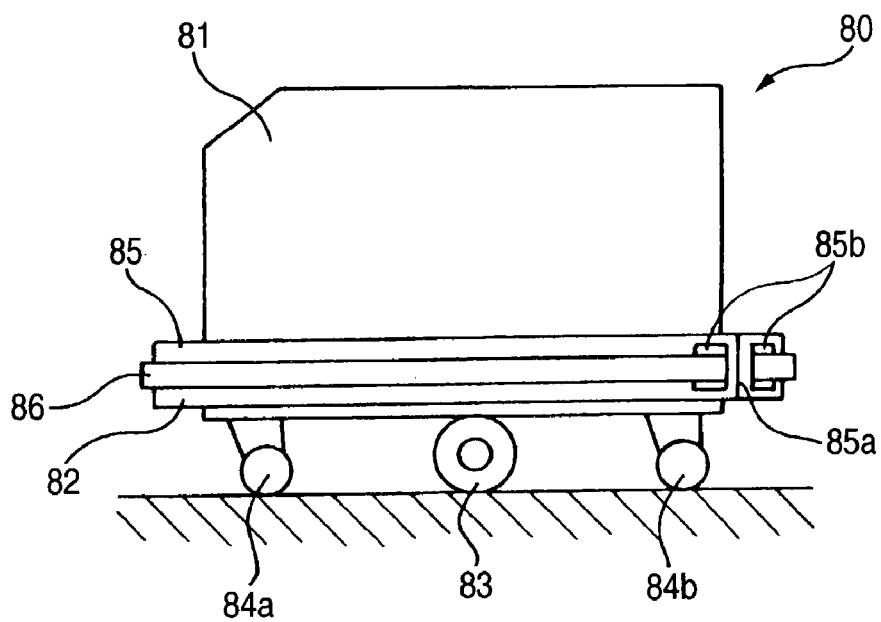
FIGS. 10A and 10B are view showing a running device comprising a conventional contact detecting device, FIG. 10A being a schematic view showing a side surface and FIG. 10B being a schematic view showing a planar section.
Figure 10B:
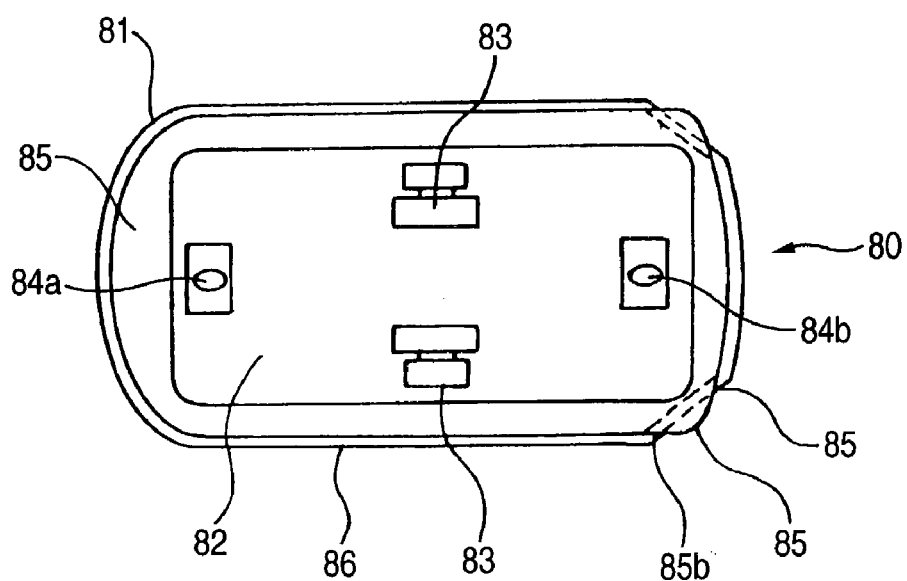

As shown in FIGS. 9A and 9B, furthermore, the contact detecting device and the running device can also be applied to a cord-shaped pressure sensitive sensor provided in a place in which a part of a human body is not desired to be pinched. FIG. 9A shows an example in which they are applied to the power window of a vehicle and FIG. 9B shows an example in which they are applied to the automatic door of an elevator.

In FIG. 9A, 50 denotes a door of a vehicle, and a windowpane 51 ascends gradually and is accommodated in a door frame 52. In this case, if the cord-shaped pressure sensitive sensor 10 is provided in the door frame 52, the windowpane 51 ascends even though the hand or finger of a child touches the windowpane 51. Consequently, the cord-shaped pressure sensitive sensor 10 detects the hand or finger before touching the door frame 52. Thus, the windowpane 51 can be stopped ascending and a motor can be rotated reversely to quickly release the hand or finger from the touch between the windowpane 51 and the door frame 52. Details of this embodiment will be discussed later.

In such a device, in the case in which a door on the passenger seat side is banged when the windowpane 51 is ascending with the door 50 on the driver side of the vehicle closed, the cord-shaped pressure sensitive sensor 10 of the door 50 on the driver side of the vehicle detects an impact oscillation so that the windowpane 51 is stopped ascending and the motor is rotated reversely.

Also in this case, however, if the first and second embodiments of the invention are employed, there is no problem. More specifically, even if the cord-shaped pressure sensitive sensor 10 of the door 50 on the driver side of the vehicle detects an impact oscillation generated by banging the door on the passenger seat side when the windowpane 51 is ascending with the door 50 on the driver side of the vehicle closed, the impact oscillation is disregarded by the filtering section 27b according to the first embodiment and/or the elastic fixing member 30 according to the second embodiment which has a different oscillation characteristic from the natural oscillation characteristic of the vehicle and the windowpane 51 can be caused to continuously ascend without erroneous detection. According to the invention, therefore, it is possible to prevent such an unnecessary malfunction. While the invention is applied to the power window of a vehicle in the embodiment, it may be applied to an electrically operated slide door, an electrically operated sunroof, a power hatch door and an electrically operated trunk.

In FIG. 9B, next, 60 denotes an elevator, 61 denotes an automatic door, and 10 denotes a cord-shaped pressure sensitive sensor provided on the tip of the automatic door 61.

In FIG. 9B, even if a part of a human body and clothes are apt to be pinched in the automatic door 61 when the automatic door 61 of the elevator 60 is closed, the cord-shaped pressure sensitive sensor 10 detects the pinching in advance. Consequently, the closing operation of the automatic door 61 is stopped and the motor is rotated reversely to start an opening operation again. Thus, a part of the human body and the clothes can be released quickly.

In such a device, in the case in which a great impact oscillation is generated on the inside or outside of the elevator 60 when the automatic door 61 of the elevator 60 is closed, the cord-shaped pressure sensitive sensor 10 detects the same impact oscillation sensitively. Consequently, the closing operation of the automatic door 61 is stopped and the motor is rotated reversely so that the opening operation is started again.

By employing the first and second embodiments of the invention, however, even if a great impact oscillation is generated on the inside or outside of the elevator 60 and the cord-shaped pressure sensitive sensor 10 detects the impact oscillation sensitively when the automatic door 61 of the elevator 60 is being closed, the impact oscillation is disregarded by the filtering section 27b according to the first embodiment and/or the elastic fixing member 30 according to the second embodiment which has a different oscillation characteristic from the natural oscillation characteristic of the elevator 60 and the closing operation of the automatic door 61 is carried out continuously without erroneous detection. According to the invention, therefore, such an unnecessary malfunction can be prevented.

In addition, the invention can prevent such an unnecessary malfunction that a great impulsive sound having a low frequency is sensed to start the opening operation again in the middle of the closing operation of the automatic door also in an automatic door provided in the entrance of a department store, a supermarket or a convenience store in which the cord-shaped pressure sensitive sensor 10 is provided (this malfunction may be caused in respect of fail-safe.

In all of the above examples, moreover, the cord-shaped pressure sensitive sensor 10 is provided in a moving thing or is provided in an opposite position to the moving thing. Also in other cases, it is a matter of course that the invention can be applied. For example, in case of security (invasion detection) in which the cord-shaped pressure sensitive sensor 10 is provided on a wall or fence in a site, the invention can be applied. When a part of the human body, clothes and tools of an invader touch the cord-shaped pressure sensitive sensor 10 provided on the wall or fence in the site, the cord-shaped pressure sensitive sensor 10 detects the touch to inform a resident in the site by means of a burglar alarm.

Also in this case, the cord-shaped pressure sensitive sensor 10 carries out erroneous detection to operate the burglar alarm by an oscillation generated when a vehicle passes through the neighborhood. According to the invention, however, these oscillations can be prevented from being detected erroneously. Consequently, the burglar alarm can be prevented from being operated erroneously.

(Third Embodiment)

Figure 11:
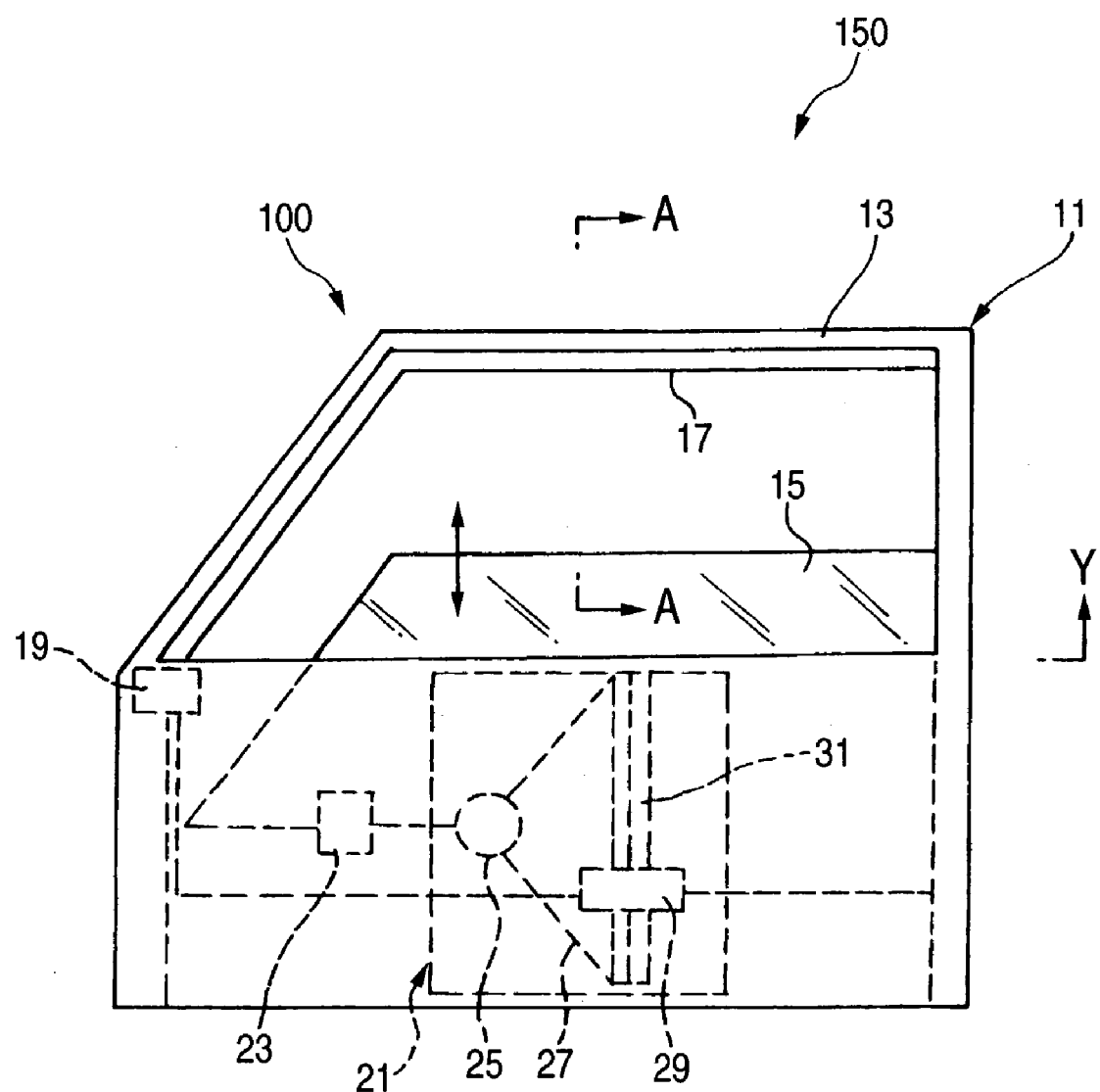
FIG. 11 is a view showing the appearance of an object detecting device comprising a pressure sensitive sensor and an opening and closing device according to the invention.

FIG. 11 is a view showing the appearance of an object detecting device 100 comprising a pressure sensitive sensor and an opening and closing device 150 according to the invention, illustrating an example of the case in which they are applied to the power window of a car. FIG. 12A is a view showing the structure of an A—A section in FIG. 11. In FIG. 12A, the right side indicates an inside of a vehicle compartment and the left side indicates an outside of the vehicle compartment.

First of all, the basic structure of the object detecting device 100 according to the embodiment is as follows. In FIG. 11, 11 denotes a door of a car, 13 denotes a window frame to be an opening section, and 15 denotes a windowpane to be an opening and closing section. 17 denotes a pressure sensitive sensor which is provided on the peripheral edge of the end of the window frame 13. 19 denotes deciding means for deciding a contact of an object with the pressure sensitive sensor 17 based on the output signal of the pressure sensitive sensor 17.

Moreover, the switchgear 150 according to the embodiment is constituted by the object detecting device 100, driving means 21 for opening and closing the windowpane 15, and control means 23 for controlling the driving means 21. The driving means 21 is constituted by a motor 25, a wire 27, a support tool 29 for the windowpane 15, and a guide 31. The wire 27 is moved by the motor 25, and the support tool 29 coupled to the wire 27 is vertically moved along the guide 31 so that the windowpane 15 is opened and closed. The driving means 21 is not restricted to a method using the wire 27 described above but may employ another method. Moreover, the control means 23 may be integrated with the motor 25.

Figure 12:
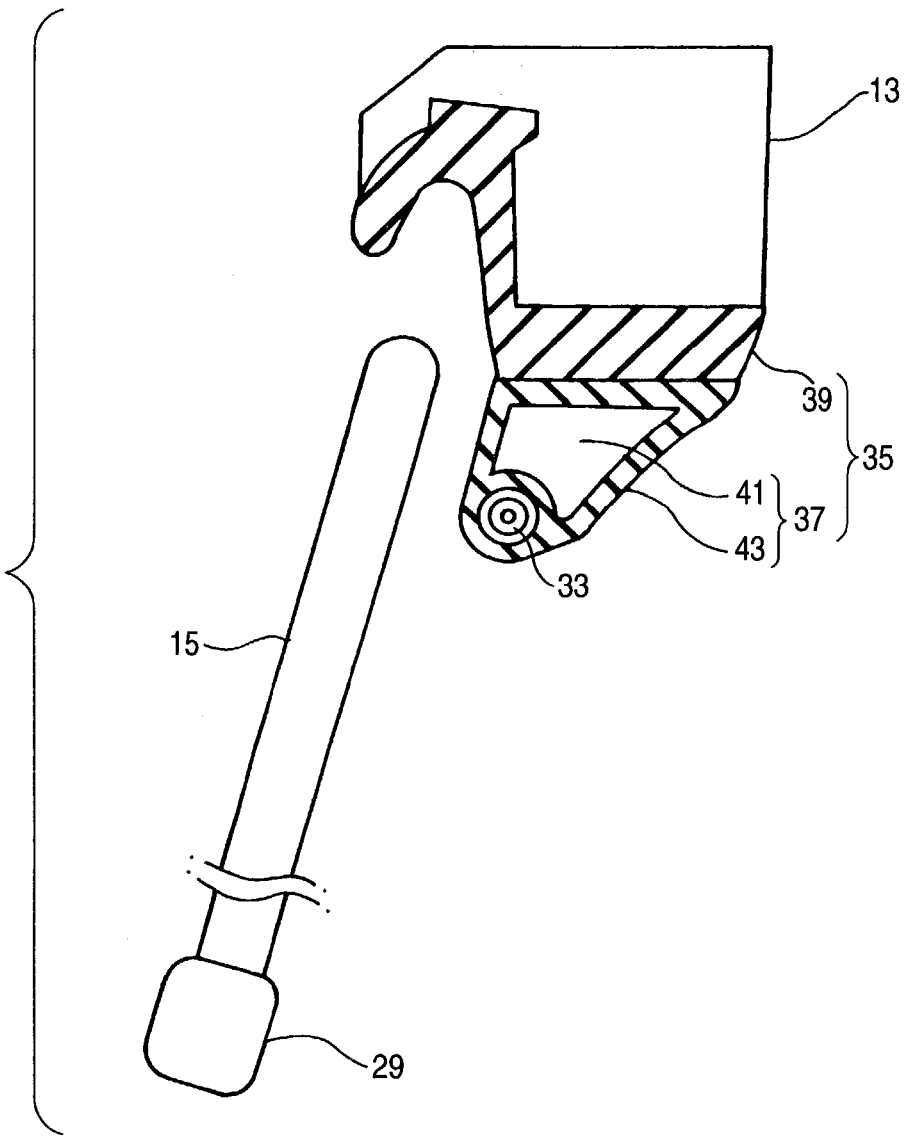
FIG. 12 is a view showing the structure of an A—A section in FIG. 11.

As shown in FIG. 12, the pressure sensitive sensor 17 according to the embodiment comprises a flexible piezoelectric sensor 33 to be pressure sensitive means, and support means 35. The support means 35 comprises a first deformation section 37 having the piezoelectric sensor 33 provided in the vicinity of a lowermost portion and formed of an elastic member such as rubber or a foamed resin member, and a second deformation section 39 bonded to the first deformation section 37 and fixed to the window frame 13. More specifically, the first deformation section 37 has a follow section 41 and a side wall section 43, and a macro elastic modulus obtained by integrating the hollow section 41 and the side wall section 43 is represented by E1 (a first elastic modulus). On the other hand, a macro elastic modulus of the second deformation section 39 is represented by E2 (a second elastic modulus) which is greater than E1. In other words, in the first deformation section 37, the thickness of the support means 35 provided around the piezoelectric sensor 33 is reduced such that the piezoelectric sensor 33 can easily be deformed, and the deformation of the piezoelectric sensor 33 is increased. Moreover, the second deformation section 39 sets the macro elastic modulus E2 to be greater than the elastic modulus E1 of the first deformation section, thereby obtaining the behavior of the deformation of the support means 35 in which the first deformation section 37 is crushed and the second deformation section 39 is then crushed. The second deformation section 39 is integrated with a weather strip provided in the window frame 13. The support means 35 is not restricted to a two-stage structure but a third deformation section may be further provided.

Moreover, thermoplastic elastomer (TPE) can be applied to the first deformation section 37 and ethylene propylene rubber (EPDM) can be applied to the second deformation section 39, for example.

Furthermore, the pressure sensitive sensor 17 is not restricted to the opening section side but may be provided on the opening and closing side.

Figure 13:
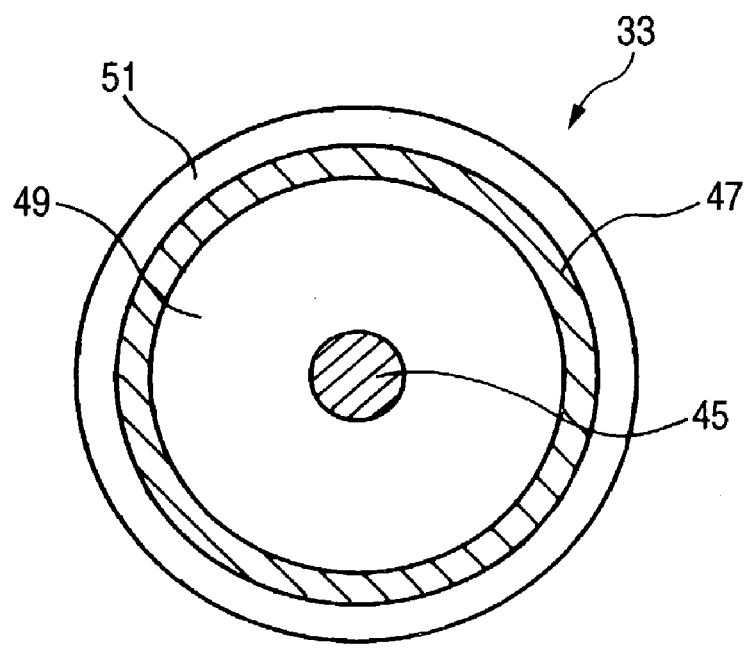
FIG. 13 is a view showing the structure of the section of a piezoelectric sensor.

FIG. 13 is a view showing the structure of the section of the piezoelectric sensor 33. The piezoelectric sensor 33 has such a structure that a center electrode 45 to be an electrode for leading a signal, a ground electrode 47, a compound piezoelectric layer 49 formed by a compound piezoelectric member mixing the sintered powder of piezoelectric ceramic with a rubber elastic member formed of chlorinated polyethylene, and a covering layer 51 are laminated concentrically, are molded like a cable and are polarized, and has a high flexibility and generates an output signal corresponding to deformation. The sintered powder of lead titanate or lead zirconate titanate is used for the piezoelectric ceramic, for example. The piezoelectric sensor 33 is manufactured in the following procedure. First of all, a chlorinated polyethylene sheet and piezoelectric ceramic having (40 to 70) vol % (lead zirconate titanate) powder are uniformly mixed like a sheet by a roll method. The sheet is cut into small pellet-shaped pieces, and the pellets are extruded continuously together with the center electrode 45, thereby forming the compound piezoelectric layer 49. Then, the ground electrode 47 is wound around the compound piezoelectric layer 49. The covering layer 51 is also extruded continuously to surround the ground electrode 47. Finally, a high DC voltage of (5 to 10) kV/mm is applied between the center electrode 45 and the ground electrode 47 in order to polarize the compound piezoelectric layer 49.

When the piezoelectric ceramic powder is to be added to the chlorinated polyethylene, it is preferable that the piezoelectric ceramic powder should be previously immersed in a solution of a titanium and coupling agent and should be dried. By this treatment, the surface of the piezoelectric ceramic powder is covered with a hydrophilic group and a hydrophobic group which are contained in the titanium and coupling agent. The hydrophilic group prevents the coagulation of the piezoelectric ceramic powder, and furthermore, the hydrophobic group increases a wettability of the chlorinated polyethylene and the piezoelectric ceramic powder. As a result, the piezoelectric ceramic powder can be uniformly added in a large amount up to 70 vol % at a maximum in the chlorinated polyethylene. It has been found that the same effects can be obtained by adding the titanium and coupling agent during the rolling of the chlorinated polyethylene and the piezoelectric ceramic powder in place of the immersion in the titanium and coupling agent solution. This treatment is excellent in that the immersion treatment in the titanium and coupling agent solution is not specially required. Thus, the chlorinated polyethylene also plays a part of a binder resin in the mixture of the piezoelectric ceramic powder.

While an ordinary metallic single conductor may be used for the center electrode 45, an electrode obtained by winding a metallic coil around an insulating polymeric fiber is used. Polyester fiber which has been commercially used in an electric blanket and a copper alloy containing 5 wt % of silver are preferable for the insulating polymeric fiber and the metallic coil, respectively.

The ground electrode 47 has such a structure that a band-shaped electrode having a metal film bonded onto a polymer layer is used and is wound around the compound piezoelectric layer 49. Since an electrode using polyethylene terephthalate (PET) as the polymer layer and having an aluminum film bonded thereto has a high thermal stability at 120□ and is also mass-produced commercially, it is preferable for the ground electrode 47. The electrode can be connected to the deciding means 19 through caulking or holdfast, for example. Moreover, a metallic single coil or a metallic braided wire may be wound around the aluminum film of the ground electrode 47 and may be thus conducted to the aluminum film, and the metallic single coil or the metallic braided wire maybe soldered to the deciding means 19. Since the soldering can be carried out, the efficiency of a work can be enhanced. In order to shield the piezoelectric sensor from the electrical noise of an external environment, it is preferable that the ground electrode 47 should be wound around the compound piezoelectric layer 49 with overlapping.

While it is preferable that vinyl chloride or polyethylene should be used for the covering layer 51, an elastic material such as rubber having a higher flexibility than that of the compound piezoelectric layer 49 may be used such that the piezoelectric sensor 33 can be deformed easily in the pressing of an object. In consideration of a heat resistance and a cold resistance of vehicle parts, a material is selected. More specifically, it is preferable that a material having a small reduction in a flexibility at −30□ to 85□ should be selected. For such rubber, for example, it is preferable to use ethylene-propylene rubber (EPDM), chloroprene rubber (CR), butyl rubber (IIR), silicone rubber (Si) or thermoplastic elastomer. By the structure described above, the minimum curvature of the piezoelectric sensor 33 can have a radius of 5 mm at a maximum.

As described above, since the compound piezoelectric member of the piezoelectric sensor 33 has the flexibility of the chlorinated polyethylene and the high temperature durability of the piezoelectric ceramic, a sensitivity is not reduced at a high temperature as in a conventional piezoelectric sensor using polyvinylidene fluoride as a piezoelectric and a high temperature durability is great, and furthermore, a vulcanizing step is not required during molding like rubber such as EPDM. Consequently, it is possible to obtain an advantage that a production efficiency is high.

Figure 14:
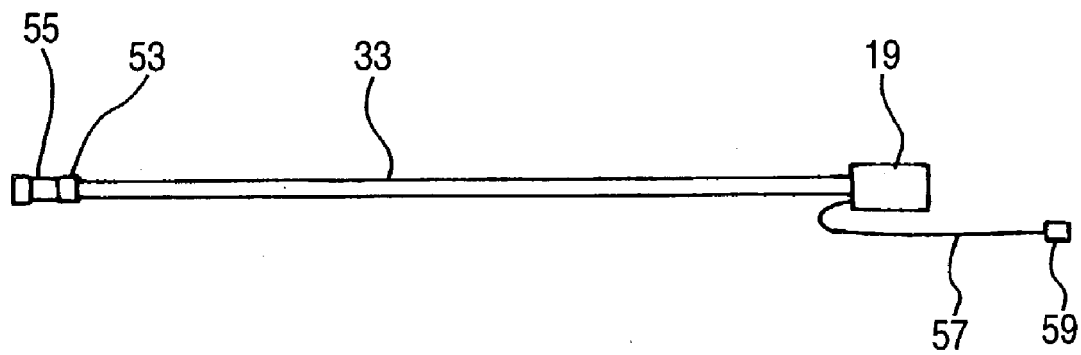
FIG. 14 is a view showing the appearance of the piezoelectric sensor.

FIG. 14 is a view showing the appearance of the piezoelectric sensor 33, in which a resistor 55 for disconnection detection is provided in an end 53 of the piezoelectric sensor 33. The resistor 55 for disconnection detection is connected between the center electrode 45 and the ground electrode 47 in the piezoelectric sensor 33. The resistor 55 for disconnection detection also serves as a discharge section for discharging an electric charge generated in the piezoelectric sensor 33 by a pyroelectric effect so that components are rationalized. The piezoelectric sensor 33 is directly connected to the deciding means 19, and the piezoelectric sensor 33 and the deciding means 19 are thus integrated. Moreover, a cable 57 for supplying a power and outputting a detection signal and a connector 59 are connected to the deciding means 19. In the case in which the piezoelectric sensor 33 is provided in the support means 35, the resistor 55 for disconnection detection is provided in the end 53 and the piezoelectric sensor 33 is inserted in the support means 35, and the piezoelectric sensor 33 and the deciding means 19 are then connected and integrated with each other. At the same time that the support means 35 is to be molded by extrusion molding, the piezoelectric sensor 33 may be extruded and provided in the support means 35 and the resistor 55 for disconnection detection may be then provided in the end 53, and the piezoelectric sensor 33 and the deciding means 19 may be thus integrated.

Figure 15:
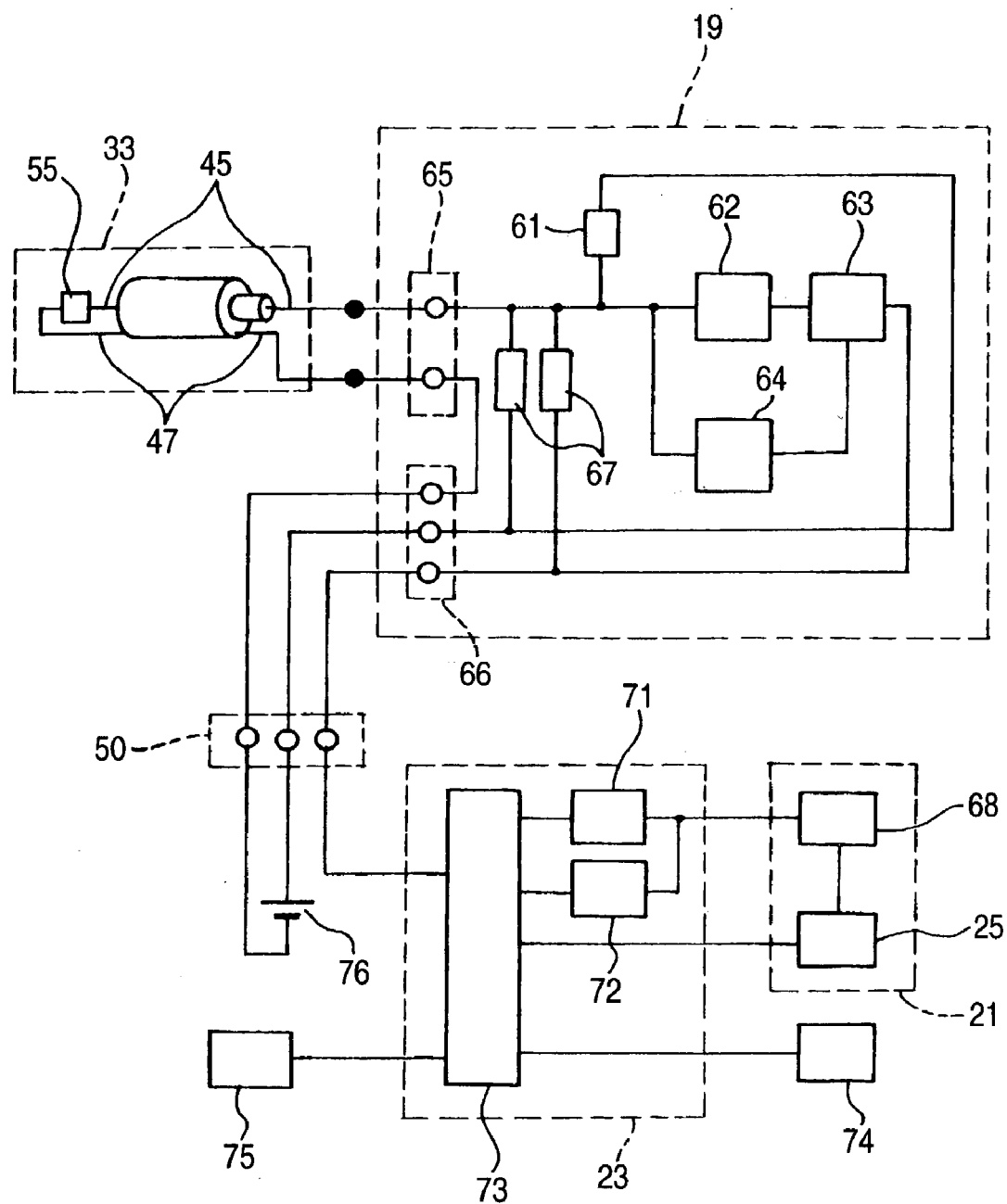
FIG. 15 is a block diagram showing the object detecting device and the opening and closing device.

FIG. 15 is a block diagram showing the object detecting device and the opening and closing device according to the embodiment. The deciding means 19 comprises a resistor 61 for voltage division which is used for detecting the disconnection of the pressure sensitive sensor 17, a filtering section 62 for passing only a predetermined frequency component from an output signal sent from the piezoelectric sensor 33, a deciding section 63 for deciding the contact of an object with the pressure sensitive sensor 17 based on an output signal sent from the filtering section 62, and an abnormality deciding section 64 for deciding the abnormality of the disconnection of the center electrode 45 and the ground electrode 47 in the piezoelectric sensor 33 from a voltage value formed by the resistor 55 for disconnection detection and the resistor 61 for voltage division. Moreover, a signal input section 65 for connecting the center electrode 45 and the ground electrode 47 to the deciding means 19 and for inputting a signal output from the piezoelectric sensor 33 to the deciding means 19 and a signal output section 66 for outputting a decision signal sent from the deciding section 63 are provided adjacently in the deciding means 19. A power line and a ground line to reach the deciding means 19 are also connected to the signal output section 66. Furthermore, the deciding means 19 has a bypass section 67 such as a capacitor provided between the signal input section 65 and the signal output section 66 and serving to bypass a high frequency signal.

The driving means 21 has a hole element 68 for detecting the rotation pulse of the motor 25.

The control means 23 comprises a position detecting section 71 for detecting the position of the upper end of the windowpane 15 based on an output signal sent from the hole element 68, an opening and closing section contact deciding section 72 for detecting the moving speed of the windowpane 15 based on the output signal sent from the hole element 68, thereby deciding the contact of an object with the windowpane 15, and a control section 73 for controlling the motor 25 based on the output signals of the deciding means 19, the position detecting section 71 and the opening and closing section contact deciding section 72.

The position detecting section 71 counts and stores a pulse signal output from the hole element 68, thereby detecting the current position of the upper end of the windowpane 15. A position Y of the upper end of the windowpane 15 is represented by a height from the lowermost point of the window frame 13 as shown in FIG. 11.

The opening and closing section contact deciding section 72 calculates the moving speed of the windowpane 15 from the pulse separation of a pulse signal output from the hole element 68 based on the fact that the moving speed of the windowpane 15 is reduced when an object comes in contact with the windowpane 15, and decides that the object comes in contact with the windowpane 15 and outputs a pulse signal of Lo→Hi→Lo if a change amount |ΔVw| per unit time of the moving speed thus calculated is greater than a preset value Vw1. Any pulse signal having an Hi level is set to be a decision signal.

Moreover, reporting means 74 for reporting the result of the decision of the deciding means 19 by means of a predetermined light provided on a front panel in a vehicle compartment and an opening and closing switch 75 for opening and closing the windowpane 15 are connected to the control means 23, and the opening and closing switch 75 includes an auto-up switch and an auto-down switch for opening and closing the windowpane 15 by a one-touch operation, and a manual-up switch and a manual-down switch for opening and closing the windowpane 15 by a manual operation. There is provided a power supply 76 comprising a battery of a car which serves to supply a power through the deciding means 19.

The filtering section 62 has such a filtering characteristic as to remove an unnecessary signal caused by the vibration of the body of a car from the output signal of the piezoelectric sensor 33 and to extract only a peculiar frequency component appearing on the output signal of the piezoelectric sensor 33 when the piezoelectric sensor 33 is deformed by pressing due to the contact of an object. In order to determine the filtering characteristic, it is preferable that the vibration characteristic of the body of the car or the vibration of the body during running should be analyzed and optimized.

In order to remove an external electrical noise, the deciding means 19 is wholly covered with a shield member and is thus shielded electrically. Moreover, the ground electrode 47 is conducted to the shield member of the deciding means 19 and the pressure sensitive sensor 17 is also shielded electrically. A countermeasure for a high electric field may be taken by adding a feed-through capacitor or an EMI filter to the input/output section of the circuit.

Next, description will be given to a basic operation for detecting the contact of an object with the pressure sensitive sensor 17 by the object detecting device.

Figure 16:
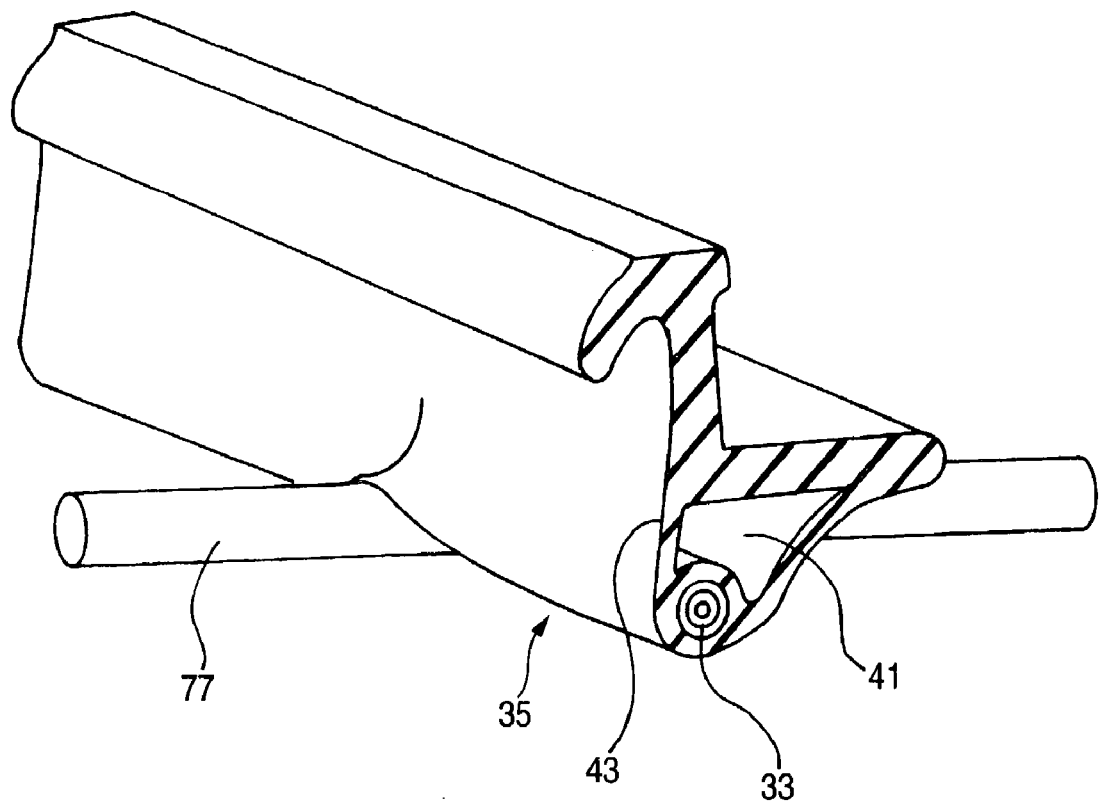
FIG. 16 is an explanatory view showing the state of the pressure sensitive sensor which is obtained when an object enters and is pinched between a window frame and a windowpane.

FIG. 16 shows the state of the pressure sensitive sensor 17 in the case in which an object 77 enters and is pinched between a window frame and a windowpane. When the object 77 comes in contact with the photosensitive sensor 17, the pressing of the object 77 is applied to the support means 35 and the piezoelectric sensor 33. The support means 35 has a more flexibility than the piezoelectric sensor 33. Therefore, the support means 35 is compressed by the pressing around a point in which the object 77 comes in contact as shown so that the side wall section 43 is deformed and the hollow section 41 is crushed simultaneously. Consequently, the piezoelectric sensor 33 is also bent and deformed around a point in which the object 77 comes in contact with the support means 35. Moreover, also when the window frame including the pressure sensitive sensor 17 is gripped by hand, the same deformation is generated in the pressure sensitive sensor 17.

When the piezoelectric sensor 33 is thus deformed, an output signal corresponding to the deformation is output from the piezoelectric sensor 33 by a piezoelectric effect. The signal output from the piezoelectric sensor 33 is filtered by the filtering section 62. In some cases, an output signal generated by an unnecessary vibration component caused by the vibration of the body of a car appears in the output signal of the piezoelectric sensor 33. The filtering section 62 removes the unnecessary signal.

Figure 17A:
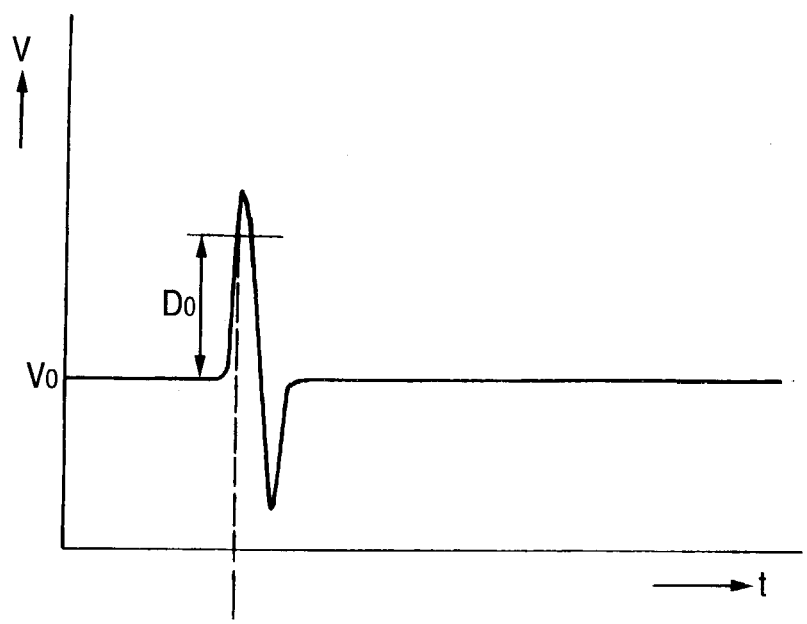
FIGS. 17A to 17C are characteristic charts showing an output signal sent from a filtering section, the decision output of deciding means and a voltage applied to a motor.
Figure 17B:
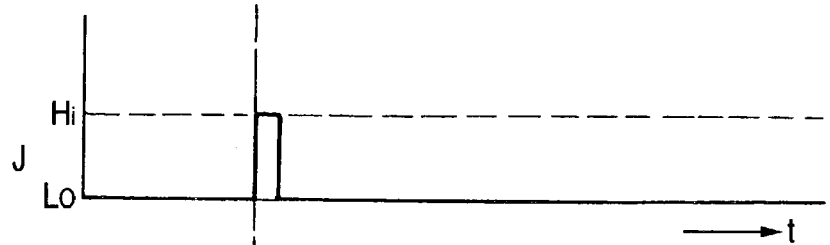
Figure 17C:
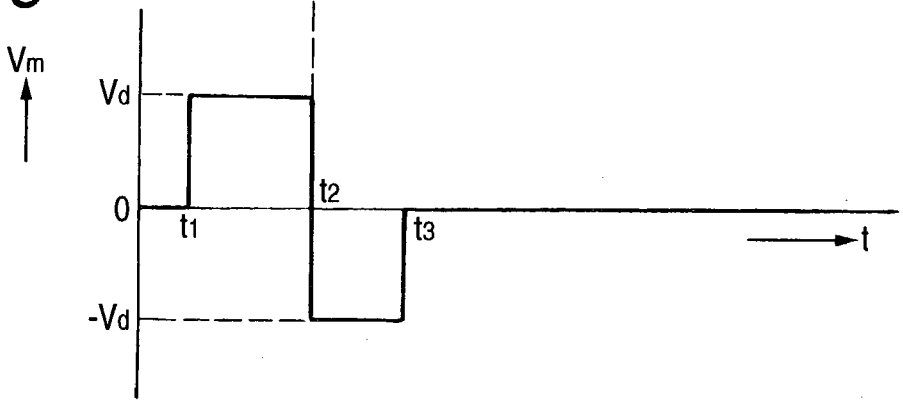

A procedure for the operations of the deciding section 63 and the control section 73 will be described with reference to FIGS. 17A to 17C. FIGS. 17A to 17C are characteristic charts showing an output signal V sent from the filtering section 62, a decision output J of the deciding means 19, and a voltage Vm to be applied to the motor 25. In FIGS. 17A to 17C, an axis of ordinate indicates V, J and Vm from the top and an axis of abscissa indicates a time t. When the auto-up switch of the opening and closing switch 75 is turned ON at a time t1, the control section 73 applies a voltage of +Vd to the motor 25 to cause the windowpane 15 to carry out a closing operation. The deciding means 19 carries out a deciding operation during the closing operation of the windowpane 15. When the object 77 is pinched as shown in FIG. 16, a signal corresponding to the acceleration of the deformation of the piezoelectric sensor 33 is output from the piezoelectric sensor 33 by the piezoelectric effect and a greater signal component than a reference potential V0 shown in FIG. 17A appears from the filtering section 62. In this case, with such a structure that the piezoelectric sensor 33 is simply provided in the window frame 13, the piezoelectric sensor 33 is slightly deformed during pinching. In the embodiment, the support means 35 has a flexibility as shown in FIG. 12 and is easily compressed during the pinching so that the amount of the deformation of the piezoelectric sensor 33 is increased.

Since the hollow section 41 is also crushed during the pinching, the amount of the deformation of the piezoelectric sensor 33 is further increased. Thus, the large amount of the deformation can be obtained for the piezoelectric sensor 33 and an acceleration to be a secondary differential value of the amount of the deformation is also increased. As a result, the output signal of the piezoelectric sensor 33 is also increased. The deciding section 63 decides that a contact with the object 77 is caused if an amplitude of $|V-V0|$ of V from V0 is greater than D0 (a first change amount) and outputs a pulse signal of Lo→Hi (a decision signal)→Lo as a decision output at a time t2 as shown in FIG. 17B.

The control section 73 stops the application of a voltage of +Vd to the motor 25 as shown in FIG. 17C in response to the decision signal if any and applies a voltage of −Vd for a constant time till a time t3 to bring down the windowpane 15 in a constant amount, thereby releasing pinching or preventing the generation of the pinching. In the case in which a pressure to be applied to the pressure sensitive sensor 17 is to be released, a signal corresponding to an acceleration restoring the deformation (a smaller signal component than the reference potential V0 in FIG. 17A) is output from the piezoelectric sensor 33.

In the deformation of the pressure sensitive sensor 17, the comparison of V with V0 is changed depending on the direction of bending or polarization of the piezoelectric sensor 33, the allotment of an electrode (a decision of one of them to be a reference potential) and the direction of support of the piezoelectric sensor 33. Since the deciding section 63 decides the pinching based on the absolute value of the amplitude of V from V0, the pinching can be decided irrespective of the comparison of V with V0.

In addition to the basic deciding method, it is possible to prevent the generation of the pinching by deciding the presence of a contact with an object in the following manner.

Figure 18A:
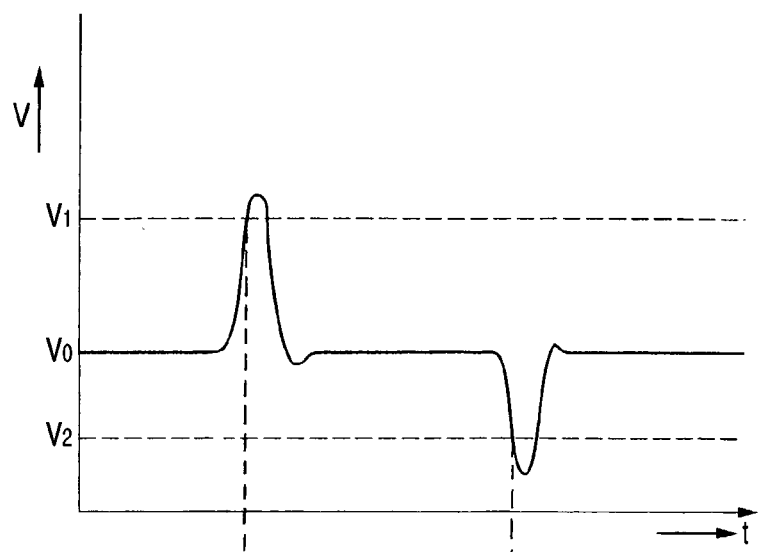
FIGS. 18A and 18B are another characteristic charts showing the output signal sent from the filtering section and the decision output of the deciding means.
Figure 18B:
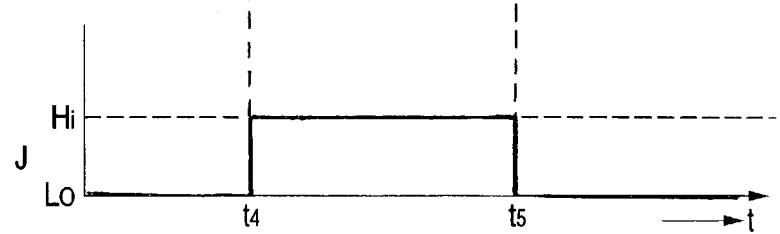

FIGS. 18A and 18B are characteristic charts showing an output signal V sent from the filtering section 62 and a decision output J of the deciding means 19. In FIGS. 18A and 18B, an axis of ordinate indicates V and J from the top and an axis of abscissa indicates a time t.

As shown in FIG. 18A, when the pressure sensitive sensor 17 is displaced by gripping the window frame 13 at a time t4, a signal is output from the piezoelectric sensor 33 by the piezoelectric effect. As a result, a greater signal component than the reference potential V0 is generated from the filtering section 62.

In the case in which the output signal V is equal to or greater than preset V1, that is, the amplitude of $|V-V0|$ of the output signal V from V0 is greater than V1 (a first change amount), the deciding section 63 decides that a contact with the object is caused, and outputs and holds a pulse signal Lo→Hi (decision signal) as a decision output at the time t4 as shown in FIG. 18B. Next, when the window frame 13 is released to cancel the displacement of the pressure sensitive sensor 17, a signal is output from the piezoelectric sensor 33 by the same piezoelectric effect and a smaller signal component than the reference potential V0 appears from the filtering section 62. At this time, in the case in which the output signal V is equal to or smaller than preset V2, that is, the amplitude of $|V-V0|$ of the output signal V from V0 is greater than V2 (a second change amount), the deciding section 63 decides that the object is separated and sets, to Hi→Lo, a pulse signal having an Hi level to be a decision signal at a time t5. In other words, the pulse signal is maintained to be Hi and the output of the decision signal is held while the contact of the object is detected and the separation is then detected.

From the time t4 that the decision signal is output and the contact of the object is then detected to the time t5 that the separation of the object is detected, the control section 39 controls to lock the operation of the windowpane 15 even if the opening and closing switch 75 is operated to bring up or down the windowpane 15. Consequently, an obstacle is detected so that the generation of pinching can be prevented, resulting in an enhancement in safety.

The output signal V is changed depending on a polarity when the piezoelectric sensor 33 is to be polarized. In that case, the positive and negative signs of a signal shown in the drawing are reversed. Therefore, it is preferable that the positive and negative signs of the set values of V1 and V2 should be reversed.

Moreover, it is also possible to have such a structure that the control means 23 side to be connected can have the function of the deciding means 19, thereby separating the deciding means 19 from the pressure sensitive sensor 17, resulting in an enhancement in the management of the installation of the pressure sensitive sensor 17 itself.

Figure 25:
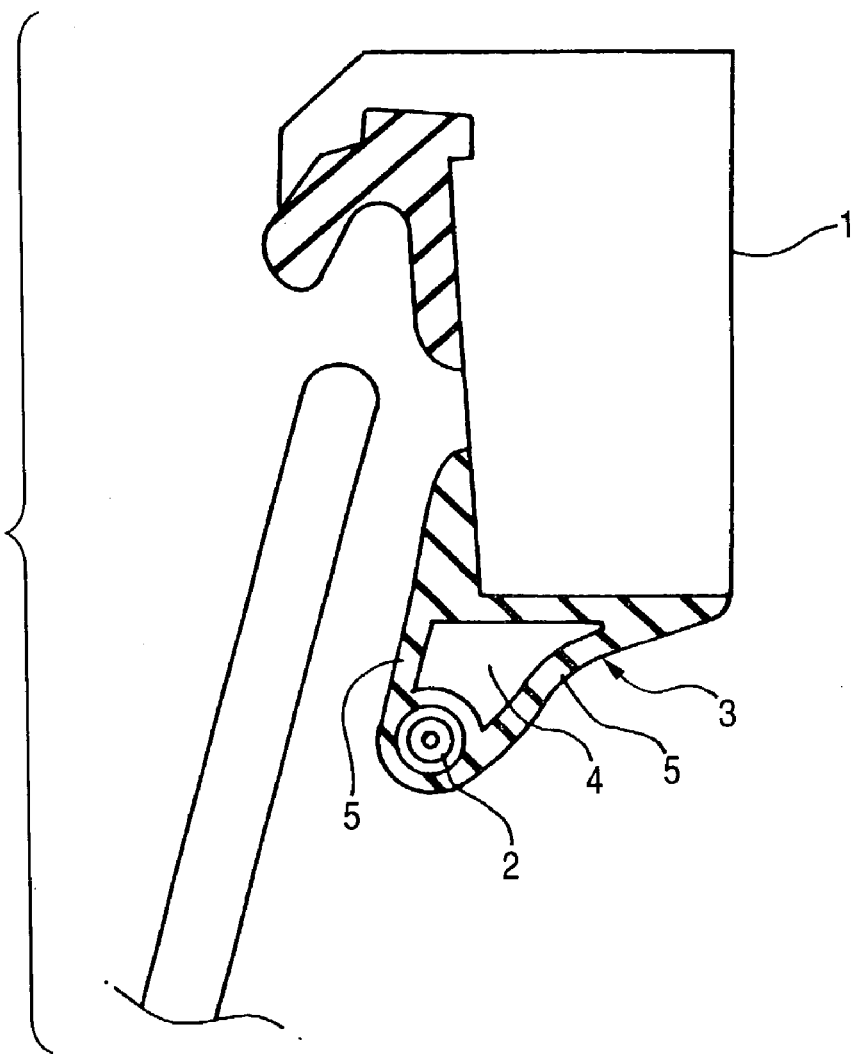
FIG. 25 is a sectional view showing an example in which a conventional pressure sensitive sensor for generating an output signal corresponding to an acceleration component is attached to a window frame.

Furthermore, in the case in which the contact and separation of the object is to be detected based on a signal output from the piezoelectric sensor 33, the structure of the support means 35 shown in FIG. 25 may be employed.

Next, the function of the support means 35 will be described.

In addition to the basic structure, the pressure sensitive sensor 17 according to the invention has such a structure that the support means 35 has at least the first deformation section 37 and the second deformation section 39 so that the deformation can also be detected at time of the application of a static load and a pressure can be detected more reliably.

FIGS. 19A to 19C show states in which a pressure is detected in a compression state, FIG. 19A being an explanatory view showing the application of a static load, FIG. 19B being an explanatory view showing a state in which a pressure is further applied, and FIG. 19C being an explanatory view showing a state in which a pressure is detected to return a windowpane.

As shown in FIG. 19A, a state in which the window frame 13 is gripped is taken as an example in which the pressure sensitive sensor 17 has already been set in a compression state. Conventionally, even if a load in a compression direction is more applied, a displacement generated in the pressure sensitive sensor 17 is very small. In order to obtain a detection signal from the piezoelectric sensor 33 on a sufficient output level, accordingly, it is necessary to use the piezoelectric sensor 33 having a high sensitivity. For this reason, there is a problem in that a cost is increased. On the other hand, in the pressure sensitive sensor 17 according to the invention, the first deformation section 37 is connected to the window frame 13 through the second deformation section 39. Even if the first deformation section 37 is completely crushed in an initial state, therefore, the second deformation section 39 is mainly deformed when a pressure is further applied by the pressing of the windowpane 15 to bring a state shown in FIG. 19B. Also in the compression state in which the first deformation section 37 is crushed, consequently, the piezoelectric sensor 33 is deformed so that a detection signal can reliably be obtained at a sufficient output level. When the windowpane 15 is stopped and is started to be brought down upon receipt of the detection signal from the piezoelectric sensor 33 as described above, the original state of FIG. 19A is set again as shown in FIG. 19C.

FIG. 20 shows a graph representing the deformation characteristics of the first deformation section 37 and the second deformation section 39. In other words, the pressure sensitive sensor 17 is accommodated in the support means 35 having a plurality of (two in the embodiment) deformation characteristics. In the initial deformation of the pressure sensitive sensor 17 in which the whole window frame 13 is gripped, the first deformation section 37 having a small macro elastic modulus (E1) is mainly deformed correspondingly. After a compression state having a constant level is brought, the second deformation section 39 having a great macro elastic modulus (E2) is deformed mainly. By constituting the support means 35 to have a deformation behavior in a plurality of stages, a detection signal having a sufficient level for detection can be obtained from the piezoelectric sensor 33 even if the pressure sensitive sensor 17 is put under a stress.

In addition to the state in which the static load is applied and the first deformation section 37 is thus crushed, moreover, the second deformation section 39 is deformed also when a dynamic load such as a vibration is applied. Consequently, the applied pressure can be detected reliably at a low cost.

Next, a variant of the support means having the deformation characteristics will be sequentially described below. The same members as those shown in FIG. 12 have the same reference numerals and description thereof will be omitted.

Figure 21:
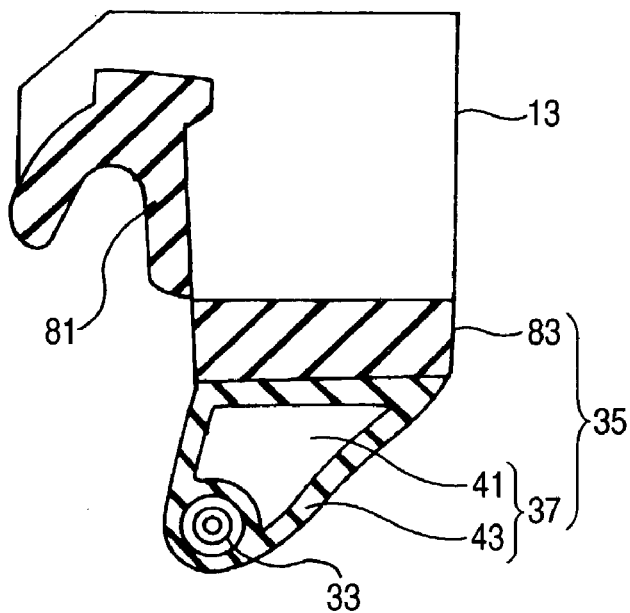
FIG. 21 is a sectional view showing a first variant in which a second deformation section is constituted separately from a weather strip.

FIG. 21 is a sectional view showing a first variant in which the second deformation section is constituted separately from the weather strip.

A first deformation section 37 according to the variant is formed separately from a weather strip 81 and is bonded to a second deformation section 83 fixed to a window frame 13. The second deformation section 83 is formed by a material having a greater elastic modulus E2 than a macro elastic modulus E1 of the first deformation section 37. For example, the second deformation section 83 may be formed of harder rubber than the first deformation section 37.

Thus, the second deformation section 83 is formed separately from the weather strip 81. Consequently, the degree of freedom of the design of the weather strip 81 can be enhanced, and furthermore, the bonding to the first deformation section 37 is eliminated so that the degree of freedom of material selection can also be enhanced.

Next, a second variant of the support means will be described.

Figure 22:
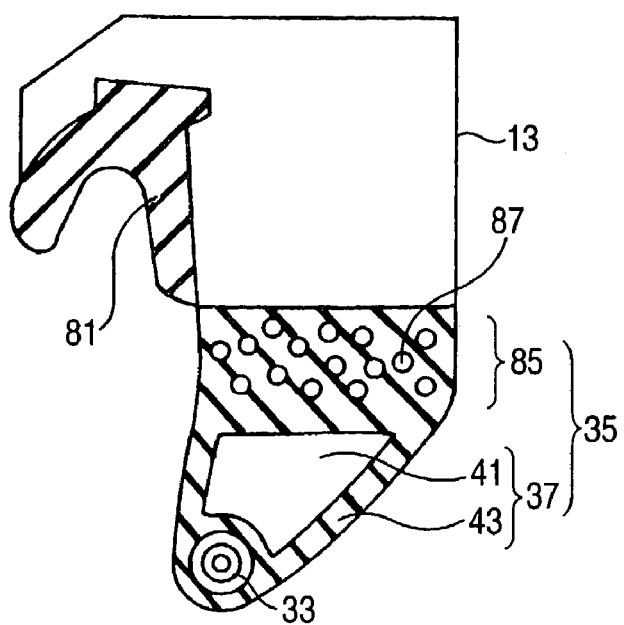
FIG. 22 is a sectional view showing a structure according to a second variant in which a second deformation section and a first deformation section are integrated.

FIG. 22 is a sectional view showing a structure according to the second variant in which a second deformation section is integrated with a first deformation section.

In the variant, a first deformation section 37 and a second deformation section 85 are formed integrally, and the second deformation section 85 has a gap 87 which is smaller than a hollow section 41 of the first deformation section 37. The gap 87 may comprise a plurality of bubbles shown in the drawing and a plurality of very small hollow sections may be formed. By the gap 87, the first deformation section 37 is crushed and the second deformation section 85 is then deformed. Thus, a pressure can be detected stably under a compressive stress. According to such a structure, moreover, the first deformation section and the second deformation section can be processed by integral molding. Consequently, a manufacturing process and an assembling process can be simplified.

Next, a third variant of the support means will be described.

Figure 23:
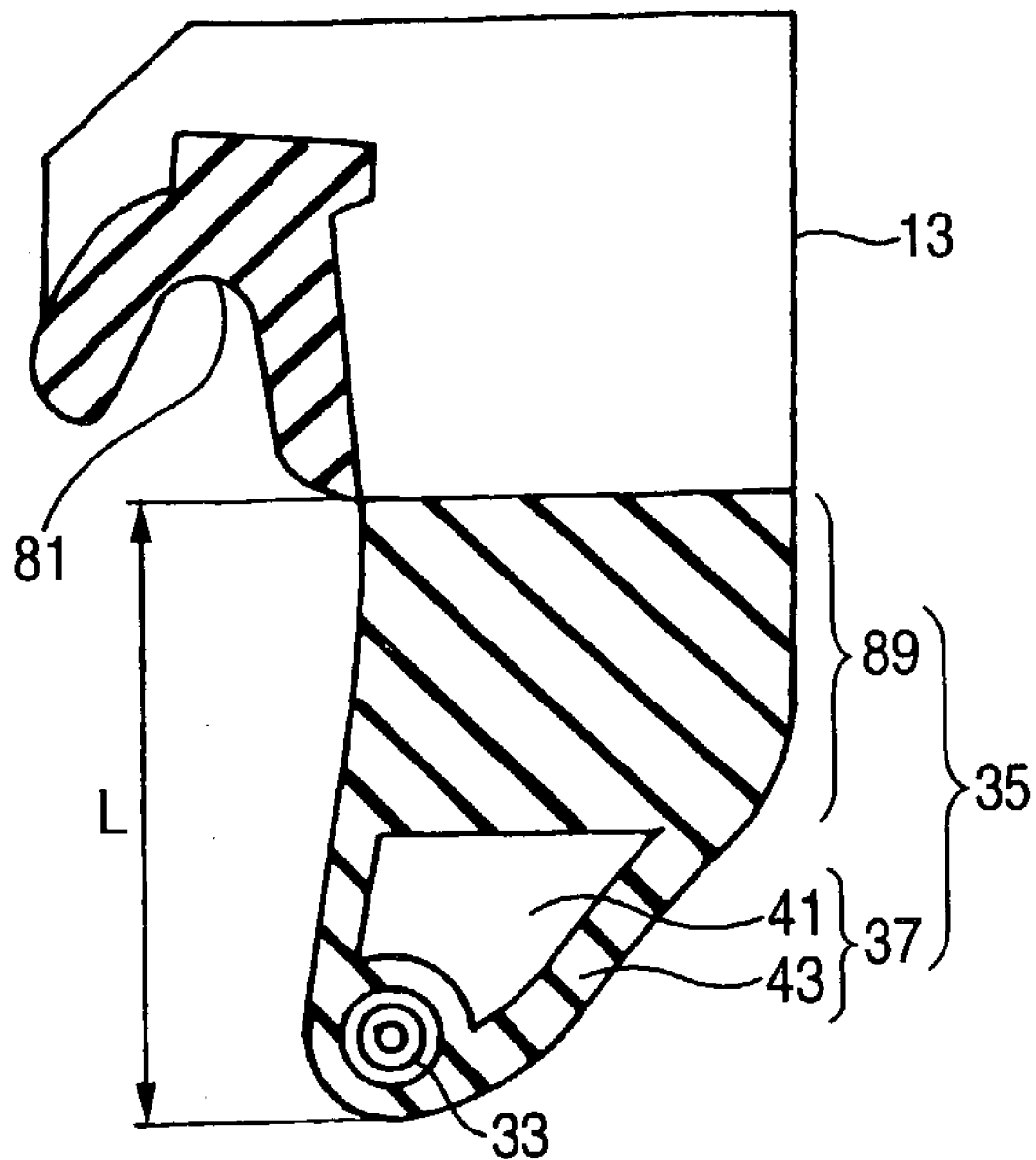
FIG. 23 is a sectional view showing a structure according to a third variant in which a second deformation section and a first deformation section are integrated.

FIG. 23 is a sectional view showing a structure according to the third variant in which a second deformation section and a first deformation section are integrated.

In the variant, a first deformation section 37 and a second deformation section 89 are formed integrally and the second deformation section 89 has a great thickness such that a distance L from a window frame 13 on the fixing side of support means 35 has a predetermined value or more. By the distance L, the first deformation section 37 is crushed and the second deformation section 89 is then deformed by its own elasticity. Consequently, a pressure can be detected stably under a compressive stress. Conventionally, the amount of the deformation of the second deformation section 89 is very small because the distance L is short. Consequently, a sufficient deformation margin cannot be taken. By increasing the distance L, however, the piezoelectric sensor 33 can easily be deformed and a pressure can be detected stably. Moreover, the first deformation section 37 and the second deformation section 89 can readily be molded integrally.

Figure 24A:
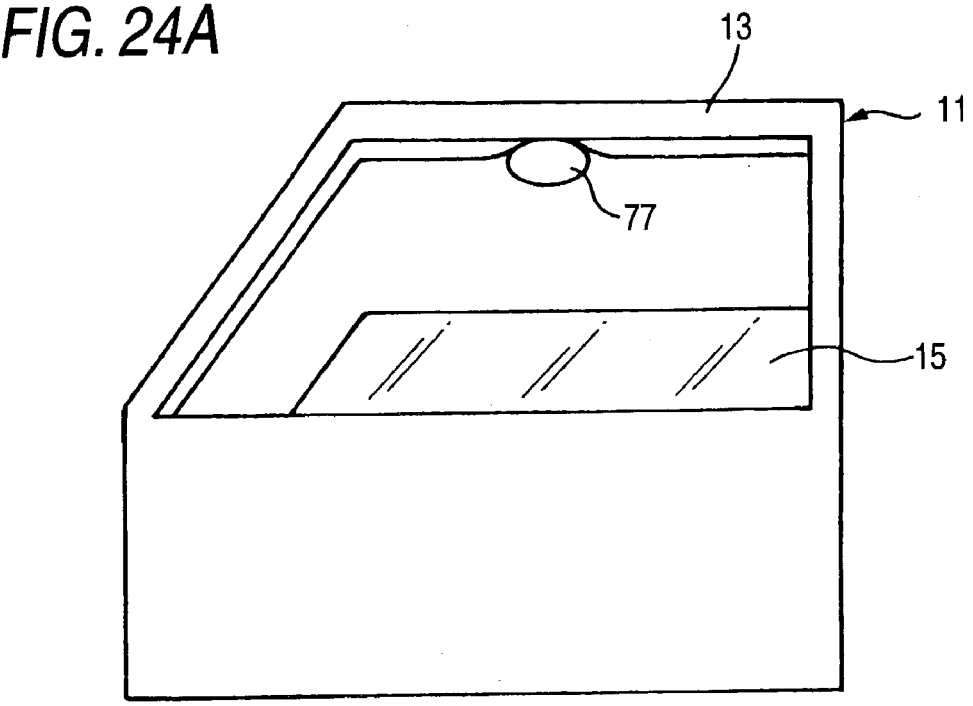
FIGS. 24A and 24B are views showing a state in which an object presses a pressure sensitive sensor during the closing operation of a windowpane, FIG. 24A being an explanatory view showing a state obtained before the deformation of a window frame and FIG. 24B being an explanatory view showing a state obtained after the deformation of the window frame.
Figure 24B:
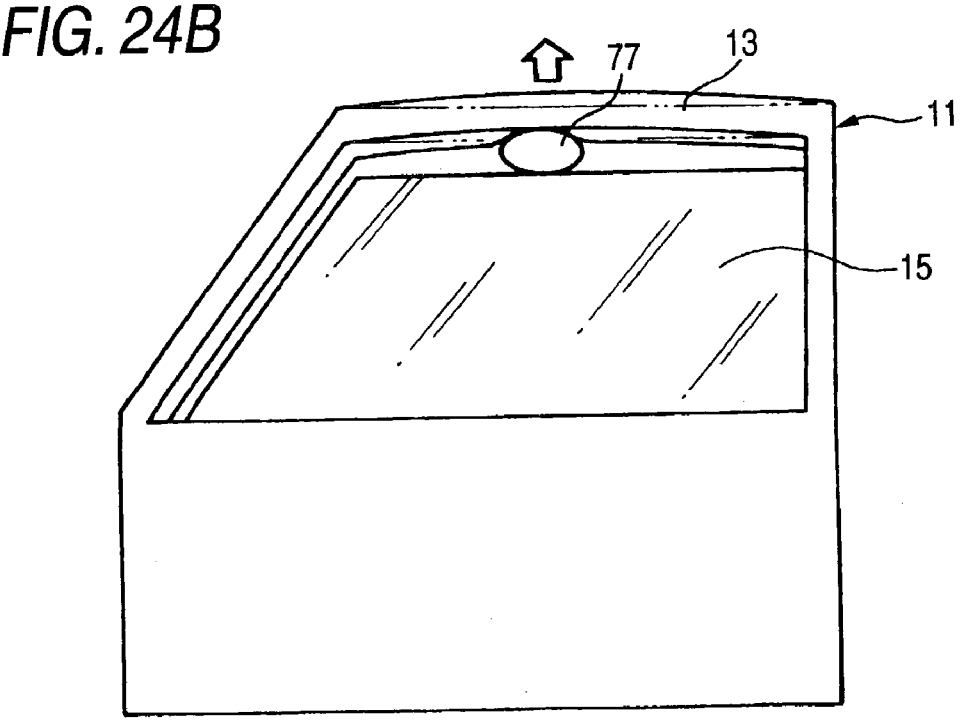

In addition to the structure according to each of the variants, the following structure can also be employed. More specifically, as shown in FIG. 24A, in the case in which an object 77 presses the pressure sensitive sensor 17 during the closing operation of a windowpane, the pressure sensitive sensor 17 does not detect that the windowpane 15 is pressed against the object 77 when the window frame 13 has a high rigidity. By setting the rigidity of the window frame 13 to be lower by a predetermined amount, however, the window frame 13 is elastically deformed and flexed when the windowpane 15 is pressed against the object 77 as shown in FIG. 24B. By the flexure, a detection signal having a sufficient output level can be obtained from the piezoelectric sensor. More specifically, the window frame 13 has the function of the second deformation section.

According to the pressure sensitive sensor, the object detecting device and the opening and closing device described above, the processing of a signal sent from the piezoelectric sensor is varied or the shape of the support means is changed. Consequently, a detection capability can be enhanced at a low cost. In other words, also in the case in which external force is suddenly applied to the pressure sensitive sensor, a time taken from the start of a contact to the end thereof is recognized based on a signal output from the piezoelectric sensor and a driving operation for this period can be locked. Also in the case in which external force is applied under a static pressure in which a pressure is preloaded to the pressure sensitive sensor, moreover, the second deformation section of the support member is deformed so that a signal having a sufficient output level can be obtained from the piezoelectric sensor and reliable detection can be carried out. By these effects, an obstacle can be detected reliably to prevent pinching so that stability can be enhanced still more.

Moreover, the invention is not restricted to a pressure sensitive sensor to be provided in the window frame of a car but can also be applied to the slide door of the side surface of a body in a car, an electrically operated sunroof provided on the ceiling of the body, an electrically operated hatch door in the rear part of the body or an electrically operated trunk, for example, and the same advantages as those described above can be obtained. Furthermore, the invention is not restricted to the car but can also be applied to an automatic door of a train or a building.

According to the invention, an object can be detected stably with high precision at a low cost in any situation by using the piezoelectric sensor for detecting an acceleration component, can enhance the effect of detecting an obstacle and preventing pinching, and can improve safety still more.

As described above, according to the contact detecting device of the invention comprising a cord-shaped pressure sensitive sensor provided on a contact detecting object and contact detecting means for detecting a contact of a thing with the contact detecting object based on a signal output from the cord-shaped pressure sensitive sensor, the contact detecting means includes a filtering section for removing an oscillation frequency component of the contact detecting object from the signal output from the cord-shaped pressure sensitive sensor. Therefore, the cord-shaped pressure sensitive sensor generates the output signal corresponding to the acceleration of deformation. Even if the piezoelectric sensor is provided along the corner section of a running device, therefore, error detection can be prevented. In addition, an oscillation during the running operation of the running device can be prevented from being picked up by the filtering section for removing the oscillation frequency component of the contact detecting object so that the erroneous detection can be prevented.

According to the contact detecting device in accordance with the second aspect of the invention, in the contact detecting device according to the first aspect of the invention, the filtering section serves to remove a frequency component including a natural frequency of the contact detecting object. By checking the natural frequency of the contact detecting object, therefore, it is possible to easily determine the filtering characteristic of the filtering section.

According to the contact detecting device in accordance with the third aspect of the invention comprising a cord-shaped pressure sensitive sensor provided on a contact detecting object and contact detecting means for detecting a contact of a thing with the contact detecting object based on a signal output from the cord-shaped pressure sensitive sensor, the cord-shaped pressure sensitive sensor is provided on the contact detecting object through support means having a different oscillation characteristic from a natural oscillation characteristic of the contact detecting object. Therefore, the cord-shaped pressure sensitive sensor generates the output signal corresponding to the acceleration of deformation. Even if the piezoelectric sensor is provided along the corner section of a running device, therefore, error detection can be prevented. In addition, an oscillation during the running operation of the running device can be prevented from being picked up by the support means having a different oscillation characteristic from the natural oscillation characteristic so that the erroneous detection can be prevented.

According to the contact detecting device in accordance with the fourth aspect of the invention, in the contact detecting device according to the first or second aspect of the invention, the cord-shaped pressure sensitive sensor is provided on the contact detecting object through support means having a different oscillation characteristic from a natural oscillation characteristic of the contact detecting object. Therefore, the double countermeasures are taken so that it is possible to more reliably prevent the erroneous detection in which the oscillation during the running operation of the running device is picked up.

According to the contact detecting device in accordance with the fifth aspect of the invention, in the contact detecting device according to any of the first to fourth aspects of the invention, the contact detecting object includes an automated guided vehicle or a bumper of a vehicle, a security object, a power window of a vehicle, or an automatic door of an elevator or a house entrance. Moreover, according to the automated guided vehicle, the vehicle, the security object or the elevator in accordance with the sixth aspect of the invention, there are provided the contact detecting device according to any of the first to fourth aspects of the invention and control means for controlling opening and closing means based on a signal output from the contact detecting device. Consequently, the automated guided vehicle or the bumper of a vehicle, the security object or the power window of a vehicle, or the automatic door of an elevator or a house entrance can be prevented from malfunctioning due to a noise other than original detection.

What is claimed is:

1. A contact detecting device comprising:
    a cord-shaped pressure sensitive sensor provided on a contact detecting object;
    contact detecting means for detecting a contact of a thing with the contact detecting object based on a signal output from the cord-shaped pressure sensitive sensor; and
    a filtering section for removing an oscillation frequency component of the contact detecting object from the signal output from the cord-shaped pressure sensitive sensor.

2. The contact detecting device according to claim 1, wherein the filtering section serves to remove a frequency component including a natural frequency of the contact detecting object.

3. A contact detecting device comprising:
    a cord-shaped pressure sensitive sensor provided on a contact detecting object;
    contact detecting means for detecting a contact of a thing with the contact detecting object based on a signal output from the cord-shaped pressure sensitive sensor; and
    a filtering section for removing an oscillation frequency component of the contact detecting object from the signal output from the cord-shaped pressure sensitive sensor,
    wherein the filtering section serves to remove a frequency component including a natural frequency of the contact detecting object,
    wherein the cord-shaped pressure sensitive sensor is provided on the contact detecting object through support means having a different oscillation characteristic from a natural oscillation characteristic of the contact detecting object.

4. The contact detecting device according to claim 3, wherein the support means including at least a first deformation section having a first elastic modulus and serving to increase deformation of the pressure sensitive sensor; and
    a second deformation section having a second elastic modulus which is higher than the first elastic modulus.

5. The contact detecting device according to claim 4, wherein the first deformation section has a hollow section and a side wall section.

6. The contact detecting device according to claim 4, wherein the first deformation section and the second deformation section are formed separately and are bonded to each other.

7. The contact detecting device according to claim 4, wherein the second deformation section is formed integrally with a part of a weather strip of a car.

8. The contact detecting device according to claim 4, wherein the second deformation section is a window frame of a car.

9. The contact detecting device according to claim 4, wherein the first deformation section and the second deformation section are formed integrally and the second deformation section has a smaller gap than the hollow section.

10. A contact detecting device comprising a cord-shaped pressure sensitive sensor provided on a contact detecting object and contact detecting means for detecting a contact of a thing with the contact detecting object based on a signal output from the cord-shaped pressure sensitive sensor, wherein the cord-shaped pressure sensitive sensor is provided on the contact detecting object through support means having a different oscillation characteristic from a natural oscillation characteristic of the contact detecting object.

11. The contact detecting device according to claim 10, wherein the support means including at least a first deformation section having a first elastic modulus and serving to increase deformation of the pressure sensitive sensor; and
    a second deformation section having a second elastic modulus which is higher than the first elastic modulus.

12. The contact detecting device according to claim 11, wherein the first deformation section has a hollow section and a side wall section.

13. The contact detecting device according to claim 11, wherein the first deformation section and the second deformation section are formed separately and are bonded to each other.

14. The contact detecting device according to claim 11, wherein the second deformation section is formed integrally with a part of a weather strip of a car.

15. The contact detecting device according to claim 11, wherein the second deformation section is a window frame of a car.

16. The contact detecting device according to claim 11, wherein the first deformation section and the second deformation section are formed integrally and the second deformation section has a smaller gap than the hollow section.

17. The contact detecting device according to any of claims 1 to 16, wherein the contact detecting object includes an automated guided vehicle or a bumper of a vehicle, a security object, a power window of a vehicle, or an automatic door of an elevator or a house entrance.

18. An automated guided vehicle, a vehicle, a security object or an elevator comprising the contact detecting device according to any of claims 1 to 16 and having control means for controlling opening and closing means based on a signal output from the contact detecting device.

* * * * *